United States Patent
Chaganti et al.

(10) Patent No.: US 10,754,708 B2
(45) Date of Patent: Aug. 25, 2020

(54) ORCHESTRATOR AND CONSOLE AGNOSTIC METHOD TO DEPLOY INFRASTRUCTURE THROUGH SELF-DESCRIBING DEPLOYMENT TEMPLATES

(71) Applicant: DELL PRODUCTS L.P., Hopkinton, MA (US)

(72) Inventors: Ravikanth Chaganti, Bangalore (IN); Rizwan Ali, Cedar Park, TX (US); Dharmesh M. Patel, Round Rock, TX (US)

(73) Assignee: EMC IP Holding Company LLC, Hopkinton, MA (US)

( * ) Notice: Subject to any disclaimer, the term of this patent is extended or adjusted under 35 U.S.C. 154(b) by 120 days.

(21) Appl. No.: 15/938,392

(22) Filed: Mar. 28, 2018

(65) Prior Publication Data

US 2019/0303213 A1 Oct. 3, 2019

(51) Int. Cl.
G06F 9/46 (2006.01)
G06F 9/52 (2006.01)
G06F 9/48 (2006.01)
G06F 16/901 (2019.01)

(52) U.S. Cl.
CPC .............. *G06F 9/52* (2013.01); *G06F 9/4881* (2013.01); *G06F 16/9024* (2019.01)

(58) Field of Classification Search
CPC ....... G06F 9/52; G06F 16/9024; G06F 9/4881
USPC ........................................................ 718/103
See application file for complete search history.

(56) References Cited

U.S. PATENT DOCUMENTS

| | | |
|---|---|---|
| 5,483,637 A | 1/1996 | Winokur et al. |
| 5,867,714 A | 2/1999 | Todd et al. |
| 6,012,152 A | 1/2000 | Douik et al. |
| 6,317,028 B1 | 11/2001 | Valiulis |
| 6,633,782 B1 | 10/2003 | Schleiss et al. |
| 6,742,141 B1 | 5/2004 | Miller |
| 6,795,935 B1 | 9/2004 | Unkle et al. |
| 7,103,874 B2 | 9/2006 | McCollum et al. |
| 7,222,127 B1 | 5/2007 | Bern et al. |
| 7,334,222 B2 | 2/2008 | Keller |
| 7,490,073 B1 | 2/2009 | Qureshi et al. |
| 7,500,142 B1 | 3/2009 | Cowart et al. |

(Continued)

OTHER PUBLICATIONS

"Integrated Dell Remote Access Controller 8 (iDRAC8)", Version 2.05.05.05 User's Guide, Dell Inc., Dec. 2014 (348 pages).

(Continued)

*Primary Examiner* — Camquy Truong
(74) *Attorney, Agent, or Firm* — Chamberlain, Hrdlicka, White, Williams & Aughtry

(57) ABSTRACT

A computing includes a persistent storage and a deployment manager. The persistent storage stores a deployment manifest repository. The deployment manager obtains a configuration request for a deployment. In response to obtaining the configuration request for the deployment, the deployment manager identifies, based on the deployment, manifests using the deployment manifest repository; generates a dependency graph of tasks specified in the manifests; orders the tasks using the generated dependency graph; generates a deployment script using the ordered tasks; and initiates a configuration of the deployment using the deployment script.

19 Claims, 15 Drawing Sheets

(56) References Cited

U.S. PATENT DOCUMENTS

| | | | |
|---|---|---|---|
| 7,516,362 | B2 | 4/2009 | Connelly et al. |
| 7,536,595 | B1 | 5/2009 | Hiltunen et al. |
| 7,757,124 | B1 | 7/2010 | Singh et al. |
| 7,831,693 | B2 | 11/2010 | Lai |
| 7,886,031 | B1 | 2/2011 | Taylor et al. |
| 7,987,353 | B2 | 7/2011 | Holdaway et al. |
| 8,001,527 | B1 | 8/2011 | Qureshi et al. |
| 8,166,552 | B2 | 4/2012 | Prafullchandra et al. |
| 8,386,930 | B2 | 2/2013 | Dillenberger et al. |
| 8,401,982 | B1 | 3/2013 | Satish et al. |
| 8,583,769 | B1 | 11/2013 | Peters et al. |
| 8,639,798 | B2 | 1/2014 | Akiyama |
| 8,826,077 | B2 | 9/2014 | Bobak et al. |
| 8,868,987 | B2 | 10/2014 | Wagner |
| 8,874,892 | B1 | 10/2014 | Chan et al. |
| 8,938,621 | B2 | 1/2015 | Mao et al. |
| 8,995,439 | B2 | 3/2015 | Field |
| 9,122,501 | B1 | 9/2015 | Hsu et al. |
| 9,122,739 | B1 | 9/2015 | Yadwadkar et al. |
| 9,201,751 | B1 | 12/2015 | Muthirisavenugopal et al. |
| 9,278,481 | B2 | 3/2016 | Hull |
| 9,355,036 | B2 | 5/2016 | Beard et al. |
| 9,384,082 | B1 | 7/2016 | Lee et al. |
| 9,542,177 | B1 | 1/2017 | Johansson et al. |
| 9,729,615 | B2 | 8/2017 | Nair |
| 9,864,634 | B2 | 1/2018 | Kenkre et al. |
| 9,898,224 | B1 | 2/2018 | Marshak et al. |
| 10,048,996 | B1 | 8/2018 | Bell et al. |
| 10,057,184 | B1 | 8/2018 | Prahlad et al. |
| 10,097,620 | B2 | 10/2018 | Reddy et al. |
| 10,514,907 | B2 | 12/2019 | Chaganti et al. |
| 2001/0044782 | A1 | 11/2001 | Hughes et al. |
| 2003/0149919 | A1 | 8/2003 | Greenwald et al. |
| 2004/0078683 | A1 | 4/2004 | Buia et al. |
| 2004/0088145 | A1 | 5/2004 | Rosenthal |
| 2004/0177168 | A1 | 9/2004 | Alabraba |
| 2004/0177354 | A1 | 9/2004 | Gunyakti et al. |
| 2004/0225381 | A1 | 11/2004 | Ritz et al. |
| 2004/0250260 | A1 | 12/2004 | Pioso |
| 2005/0033770 | A1 | 2/2005 | Oglesby et al. |
| 2005/0078656 | A1 | 4/2005 | Bryant et al. |
| 2005/0120112 | A1 | 6/2005 | Wing et al. |
| 2005/0144151 | A1 | 6/2005 | Fischman et al. |
| 2005/0144188 | A1 | 6/2005 | Bailey et al. |
| 2006/0149408 | A1 | 7/2006 | Speeter et al. |
| 2006/0178864 | A1 | 8/2006 | Khanijo |
| 2006/0179116 | A1 | 8/2006 | Speeter et al. |
| 2006/0235962 | A1 | 10/2006 | Vinberg et al. |
| 2007/0143851 | A1 | 6/2007 | Nicodemus et al. |
| 2007/0202469 | A1 | 8/2007 | Davidson |
| 2008/0037532 | A1 | 2/2008 | Sykes et al. |
| 2008/0065700 | A1 | 3/2008 | Lim |
| 2008/0201470 | A1 | 8/2008 | Sayama |
| 2008/0228755 | A1 | 9/2008 | Haga et al. |
| 2008/0262860 | A1 | 10/2008 | Schneider et al. |
| 2009/0012805 | A1 | 1/2009 | Schnell et al. |
| 2009/0113248 | A1 | 4/2009 | Bock et al. |
| 2009/0165099 | A1 | 6/2009 | Eldar et al. |
| 2009/0183010 | A1 | 7/2009 | Schnell et al. |
| 2009/0260071 | A1 | 10/2009 | Sadovsky et al. |
| 2009/0282283 | A1 | 11/2009 | Sakakura et al. |
| 2010/0024001 | A1 | 1/2010 | Campbell |
| 2010/0057677 | A1 | 3/2010 | Rapp et al. |
| 2010/0180221 | A1 | 7/2010 | Cloward et al. |
| 2010/0229022 | A1 | 9/2010 | Anand et al. |
| 2010/0312522 | A1 | 12/2010 | Laberge et al. |
| 2010/0318487 | A1 | 12/2010 | Marvasti |
| 2010/0325493 | A1 | 12/2010 | Morimura et al. |
| 2011/0078428 | A1 | 3/2011 | Hamid |
| 2011/0093703 | A1 | 4/2011 | Etchegoyen |
| 2011/0270482 | A1 | 11/2011 | Holzer |
| 2011/0289342 | A1 | 11/2011 | Schaefer et al. |
| 2011/0289343 | A1 | 11/2011 | Schaefer et al. |
| 2011/0302305 | A1 | 12/2011 | Morimura et al. |
| 2012/0041976 | A1 | 2/2012 | Annapragada |
| 2012/0110142 | A1 | 5/2012 | Montagna et al. |
| 2012/0144244 | A1 | 6/2012 | Dan et al. |
| 2012/0150926 | A1 | 6/2012 | Adkins et al. |
| 2012/0166142 | A1 | 6/2012 | Maeda et al. |
| 2012/0182151 | A1 | 7/2012 | Tong |
| 2012/0233216 | A1 | 9/2012 | Lim |
| 2012/0265872 | A1 | 10/2012 | Chilton |
| 2012/0271927 | A1 | 10/2012 | Shakirzyanov et al. |
| 2012/0331526 | A1 | 12/2012 | Caudle |
| 2013/0151975 | A1* | 6/2013 | Shadi .................. G06F 8/60 715/734 |
| 2013/0185667 | A1 | 7/2013 | Harper et al. |
| 2013/0326029 | A1 | 12/2013 | Flynn |
| 2014/0069291 | A1 | 3/2014 | Yang |
| 2014/0082417 | A1 | 3/2014 | Barton et al. |
| 2014/0115176 | A1 | 4/2014 | Kamboh et al. |
| 2014/0281675 | A1 | 9/2014 | Sreenivasan et al. |
| 2014/0304399 | A1 | 10/2014 | Chaudhary et al. |
| 2014/0304402 | A1 | 10/2014 | Prakash et al. |
| 2014/0324276 | A1 | 10/2014 | Weaks |
| 2015/0117174 | A1 | 4/2015 | Alber et al. |
| 2015/0120359 | A1 | 4/2015 | Dongieux |
| 2015/0149822 | A1 | 5/2015 | Coronado et al. |
| 2015/0256394 | A1 | 9/2015 | Palmer |
| 2016/0042288 | A1 | 2/2016 | Cohen et al. |
| 2016/0048611 | A1 | 2/2016 | Cox |
| 2016/0057009 | A1 | 2/2016 | Kadayam et al. |
| 2016/0110240 | A1 | 4/2016 | Reger et al. |
| 2016/0112504 | A1 | 4/2016 | Mathur et al. |
| 2016/0173690 | A1 | 6/2016 | Perez et al. |
| 2016/0302323 | A1 | 10/2016 | Gosselin |
| 2017/0017881 | A1 | 1/2017 | Langley et al. |
| 2017/0032091 | A1 | 2/2017 | Rudorfer et al. |
| 2017/0094003 | A1 | 3/2017 | Gahlot et al. |
| 2017/0206128 | A1 | 7/2017 | Anderson et al. |
| 2017/0339005 | A1 | 11/2017 | Yuan et al. |
| 2018/0025166 | A1 | 1/2018 | Daniel et al. |
| 2018/0034709 | A1 | 2/2018 | Chen et al. |
| 2018/0285009 | A1 | 10/2018 | Guim Bernat et al. |
| 2018/0321934 | A1 | 11/2018 | Chaganti et al. |
| 2018/0322019 | A1* | 11/2018 | Stowell .................. G06F 9/4843 |
| 2018/0329579 | A1 | 11/2018 | Kaimal et al. |
| 2019/0123985 | A1 | 4/2019 | Rao et al. |
| 2019/0182105 | A1 | 6/2019 | Stephens et al. |
| 2019/0303137 | A1 | 10/2019 | Chaganti et al. |
| 2019/0306013 | A1 | 10/2019 | Ali et al. |
| 2019/0324841 | A1 | 10/2019 | Patel et al. |

OTHER PUBLICATIONS

Iler, Doug, et al., "Introducing iDRAC8 with Lifecycle Controller for Dell 13th Generation PowerEdge Servers", A Dell Deployment and Configuration Guide, Dell Inc., Sep. 2014 (16 pages).
"Dell EMC OpenManage Essentials Version 2.3: User's Guide"; XP055602720; Oct. 1, 2017; https://topics-cdn.dell.com/pdf/openmanage-essentials-v23 users-guide en-us.pdf.
"Dell Drag—Wikipedia"; XP055602141; Mar. 23, 2018; https://en.wikipedia.org/w/index.php?title=Dell_DRAC&oldid=831957421.
Extended European Search Report issued in corresponding European Application No. 19165339.3, dated Aug. 6, 2019.
Extended European Search Report issued in corresponding European Application No. 19165337.7, dated Aug. 28, 2019.
Tweed, Duncan, "BMC Atrium Discovery User Guide", BMC Software, Inc., retrieved from https://bmc.com/ (218 pages) 2014.
Tweed, Duncan, "Baseline configuration", BMC Software, Inc., retrieved from https://bnnc.conn/ (10 pages) 2015.
Parvez, Masoom, "AutonnaticGroup Node", BMC Software, Inc., retrieved from https://bnnc.conn/ (2 pages) 2014.
Extended European Search Report issued in corresponding European Application No. 18200661.9 dated Apr. 1, 2019. (9 pages).
Extended European Search Report issued in corresponding application No. 19151952.9, dated Jul. 1, 2019 (7 pages).

(56) References Cited

OTHER PUBLICATIONS

Zhengyu Liang et al.; "ClusterProbe: An Open, Flexible and Scalable Cluster Monitoring Tool"; IEEE Computer Society International Workshop on Cluster Computing; pp. 261-268; 1999.

\* cited by examiner

Obtained Configuration Actions 510

First Configuration Action: Disable connection between Computing Device A and Computing Device D 512

Second Configuration Action: Enable connection between Computing Device C and Computing Device D 514

Third Configuration Action: Disable connection between Computing Device B and Computing Device E 516

Fourth Configuration Action: Enable connection between Computing Device A and Computing Device E 518

FIG. 5B

Example Dependency Graph 520

Dependency Chain A 521

First Configuration Action: Disable connection between Computing Device A and Computing Device D 522

Second Configuration Action: Enable connection between Computing Device C and Computing Device D 524

Dependency Chain B 522

Third Configuration Action: Disable connection between Computing Device B and Computing Device E 526

Fourth Configuration Action: Enable connection between Computing Device A and Computing Device E 528

FIG. 5C

ORCHESTRATOR AND CONSOLE AGNOSTIC METHOD TO DEPLOY INFRASTRUCTURE THROUGH SELF-DESCRIBING DEPLOYMENT TEMPLATES

BACKGROUND

Computing devices may include any number of internal components such as processors, memory, and persistent storage. Each of the internal components may operate with other components of the computing devices. For example, some processors store generated data in a persistent storage and may utilize capacity of the memory to perform computations.

In a network environment, multiple computing devices may cooperate to accomplish a task. For example, multiple computing devices may perform different computations that may be used, in turn, to generate a final result.

SUMMARY

In one aspect, a computing device in accordance with one or more embodiments of the invention includes a persistent storage and a deployment manager. The persistent storage stores a deployment manifest repository. The deployment manager obtains a configuration request for a deployment. In response to obtaining the configuration request for the deployment, the deployment manager identifies, based on the deployment, manifests using the deployment manifest repository; generates a dependency graph of tasks specified in the manifests; orders the tasks using the generated dependency graph; generates a deployment script using the ordered tasks; and initiates a configuration of the deployment using the deployment script.

In one aspect, a method for initiating the configuration of a distributed device in accordance with one or more embodiments of the invention includes obtaining a configuration request for a deployment. In response to obtaining the configuration request for the deployment, manifests are identified based on the deployment and a deployment manifest repository; a dependency graph of tasks of the manifests is generated; the tasks are ordered using the generated dependency graph; a deployment script is generated using the ordered tasks; and configuration of the distributed device is initiated using the deployment script.

In one aspect, a non-transitory computer readable medium in accordance with one or more embodiments of the invention includes computer readable program code, which when executed by a computer processor enables the computer processor to perform a method of initiating the configuration of a distributed device. The method includes obtaining a configuration request for a deployment. In response to obtaining the configuration request for the deployment, manifests are identified based on the deployment and a deployment manifest repository; a dependency graph of tasks of the manifests is generated; the tasks are ordered using the generated dependency graph; a deployment script is generated using the ordered tasks; and configuration of the distributed device is initiated using the deployment script.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 5B shows a diagram of configuration actions for configuring the example deployment of FIG. 5A.

FIG. 5C shows a diagram of a dependency graph of the configuration actions of FIG. 5B.

DETAILED DESCRIPTION

Figure 1:
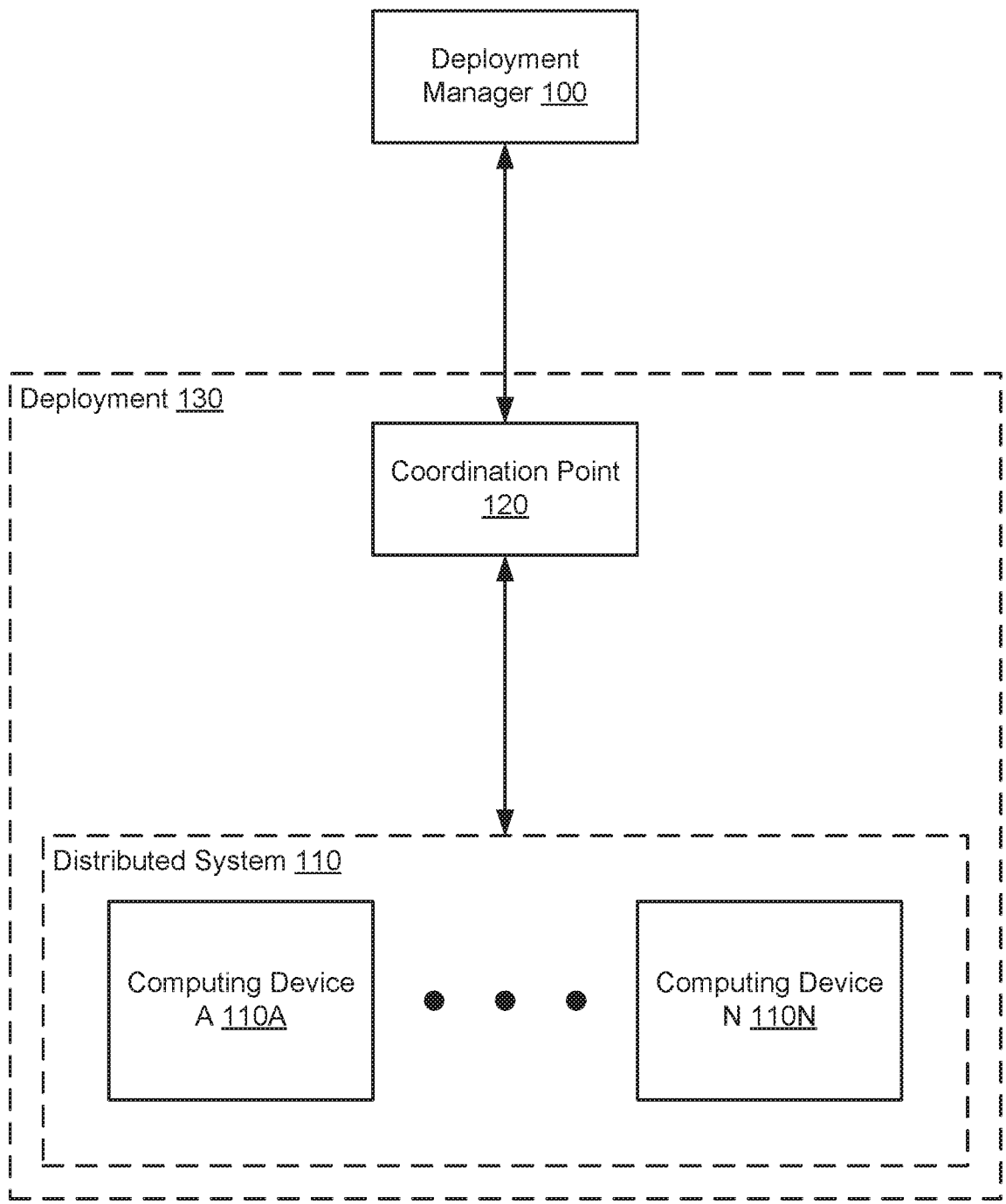
FIG. 1 shows a diagram of a system in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to systems, devices, and methods for facilitating the configuration of a deployment. A deployment may be a group of computing devices. To accomplish a function or goal of the deployment, each of the computing devices of the deployment may be configured.

To facilitate configuration of the computing devices, one or more embodiments of the embodiments of the invention may provide a mechanism for generating a script, or other data structure, that at least partially automates the configuration process. The script may be executed by the deployment to cause one or more processes executing on the deployment to configure the computing devices of the deployment.

In one or more embodiments of the invention, the script is generated based on information about the deployment. The information about the deployment may be used to obtain any number of configuration actions, e.g., templates, on which the script is based. A configuration action may represent a portion of the process of configuring a deployment. The configuration actions may be obtained from a repository, or other data structure, that includes configuration actions for all possible deployment scenarios.

In one or more embodiments of the invention, the configuration actions may include dependencies. A dependency may indicate a relationship between one configuration action and one or more other configurations that must be performed prior to the performance of the associated configuration action. For example, it may be required to activate a network adapter of a computing device before the computing device may establish a connection with a second computing device. One or more embodiments of the invention may facilitate the identification of dependencies and automatic ordering of performance of the configuration actions based on the identified dependencies. Doing so may ensure that each configuration action is performed on computing devices in predetermined states.

In one or more embodiments of the invention, the generated script may automatically modify its behavior in response to differences between the actual state of computing devices of a deployment and assumptions regarding the state of the computing devices of the deployment when the script was generated. Doing so may allow the script to dynamically adapt to an actual state of a deployment and thereby ensure that each computing device of the deployment is configured in a manner that enables the deployment to accomplish a predetermined goal.

FIG. 1 shows a system in accordance with one or more embodiments of the invention. The system may include a deployment manager (100) that facilitates the configuration of a deployment (130). The deployment (130) may include a distributed system (110). The distributed system (110) may include a number of computing devices (110A, 110N). Each of the computing devices (110A, 110N) may be configurable. The deployment manager (100) may facilitate the configuration of each of the computing devices (110A, 110N) to enable the distributed system (110) to perform predetermined functions. Each of the computing devices (110A, 110N) may be configured similarly or differently. The system may also include a coordination point (120) that configures the computing devices (110A, 110N) of the deployment (130) using information obtained from the deployment manager (100). While illustrated in FIG. 1 as being a portion of the deployment (130), the coordination point (120) may be a separate entity from the deployment (130) without departing from the invention. Each of the components of the system may be operably connected to each other using any combination and quantity of wired and/or wireless networks. Each component of the system is discussed below.

In one or more embodiments of the invention, the deployment manager (100) generates configuration data used to configure computing devices of a distributed system (e.g., 110). The configuration data may be, for example, an executable script. The executable script may be executed by a coordination point of a deployment (e.g., 130) and/or computing devices of a distributed system of the deployment (130). Executing the executable script may cause the entity that executes the executable script to configure all or a portion of the computing devices of a deployment (130).

Configuring the computing devices may include configuring hardware, firmware, and/or applications of the computing devices of the deployment (130). By configuring the computing devices, the deployment manager (100) may enable all of the computing devices, or a portion thereof, of the deployment (130) to cooperatively perform predetermined functionality. The predetermined functionality may be, for example, data storage services, deduplication services, virtual infrastructure services, private/hybrid cloud infrastructure services, and/or any other type of service.

In one or more embodiments of the invention, the deployment manager (100) is implemented as a computing device. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the deployment manager (100) described throughout this application and/or all, or a portion thereof, of the methods illustrated in FIGS. 4A-4D. For additional details regarding the deployment manager, See FIG. 2.

In one or more embodiments of the invention, the coordination point (120) obtains the configuration data from the deployment manager (100). The coordination point (120) uses the configuration data obtained from the deployment manager (100) to configure the deployment (130). The configuration data obtained from the deployment manager (100) may be, for example, an executable script, ordered tasks, or data structures having any form that enable a deployment to be configured without departing from the invention.

In one or more embodiments of the invention, the coordination point (120) is implemented as a computing device. The computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions of the coordination point (120) described throughout this application.

In one or more embodiments of the invention, the distributed system (110) includes any number of computing devices (110A, 110N) orchestrated to accomplish one or more predetermined goals. The goals may be, for example, to store data/provide data storage services, to provide stored data (e.g. operate as a file server), and/or to perform computations on stored data. The goals may be other types of goals without departing from the invention.

In one or more embodiments of the invention, the computing devices (110A, 110N) are hardware devices. The computing devices (110A, 110N) may be similar to the computing devices illustrated in FIG. 6. The computing devices (110A, 110N) may include additional, fewer, and/or different components than those illustrated in FIG. 6 without departing from the invention.

The distributed system (110) may be, for example, a computer cluster. While the distributed system (110) is illustrated as only including computing devices (110A, 110N), the distributed system (110) may include other components such as switches, routers, network attached storage, or other devices without departing from the invention. The other components (not shown) may provide, for example, operable connections between computing devices of the distributed system (110) and/or other entities.

In one or more embodiments of the invention, the distributed system (110) orchestrates the operation of the computing devices (110A, 110N) by utilizing the computing resources of the computing devices (110A, 110N). To facilitate the utilization of the computing resources of the computing devices (110A, 110N), each of the computing devices (110A, 110N) may be configured by the coordination point (120) or another entity.

In one or more embodiments of the invention, the process of configuring a computing device includes disabling and/or enabling hardware components of the computing devices (110A, 110N). The hardware components may be, for example, storage devices, processing devices, memory devices, and/or communication devices. Other types of hardware devices of the computing devices may be enabled/disabled as part of the process of configuring a computing device without departing from the invention.

Additionally, the process of configuring a computing device may include loading and/or modifying firmware on one or more computing devices (110A, 110N) or instructing the coordination point (120) to load and/or modify firmware on computing devices (110A, 110N). The firmware may be, for example, computer software.

The process of configuring a computing device may include modifying firmware settings, such as, for example, network adapter settings on one or more computing devices (110A, 110N) or instructing the coordination point (120) to modify firmware settings on one or more computing devices (110A, 110N). The firmware settings may be stored in any format and control the operation of any number of corresponding firmware functions.

The process of configuring a computing device may include uploading, updating, and/or reconfiguring user applications. The user applications may be, for example, an operating system, of one or more computing devices (110A, 110D). As used herein, a user application refers to any process executing on a computing device initiated by a user. In a distributed system (110, FIG. 1), the user may be, for example, the coordination point (120).

While the system of FIG. 1 has been illustrated as including a limited number of components for the sake of brevity, the system may include additional components (not shown), fewer components, and/or different components (not shown) without departing from the invention.

Figure 2:
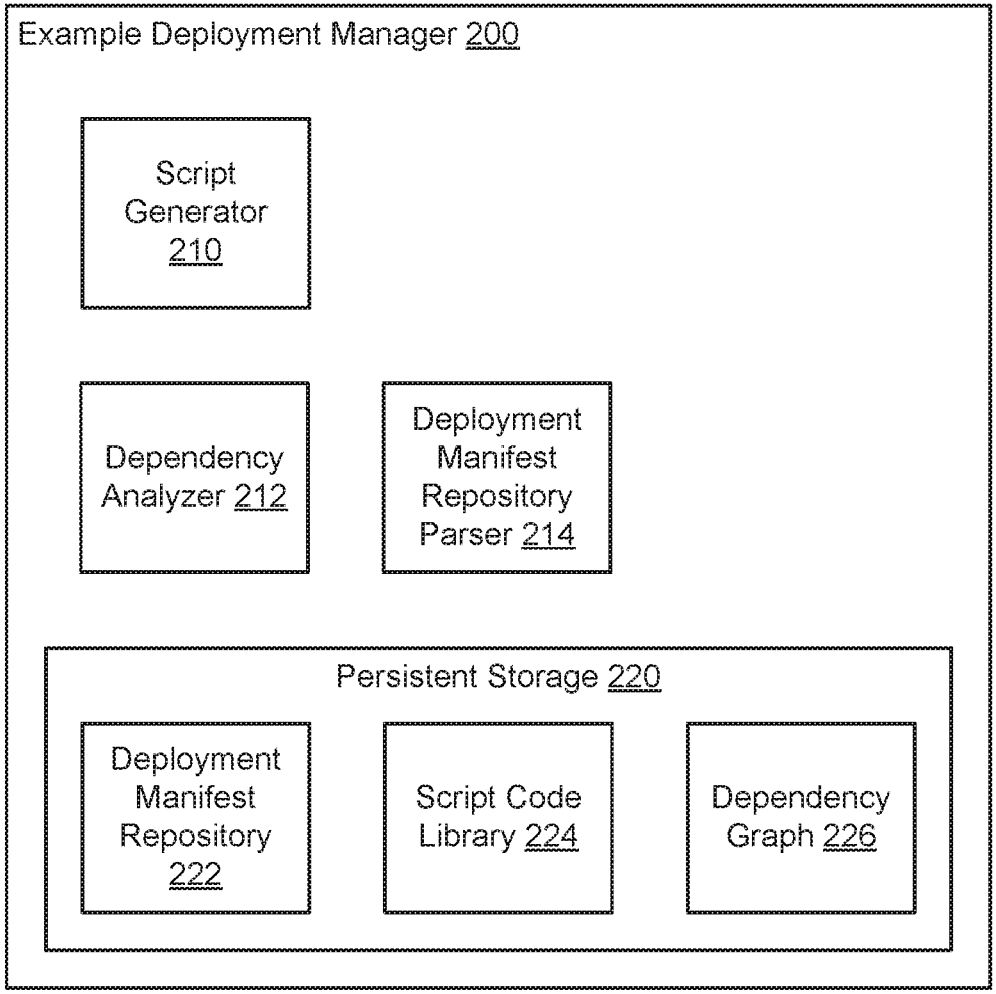
FIG. 2 shows a diagram of an example deployment manager in accordance with one or more embodiments of the invention.

FIG. 2 shows a diagram of an example deployment manager (200) in accordance with one or more embodiments of the invention. The example deployment manager (200) may be the same as the deployment manager (100, FIG. 1) discussed above. As discussed above, the example deployment manager (200) may obtain information regarding a deployment, generate information used to configure a deployment, and/or initiate configuration of a deployment. To provide the aforementioned functionality, the example deployment manager (200) includes a script generator (210), a dependency analyzer (212), a deployment manifest repository parser (214), and a persistent storage (220). The persistent storage (220) may include data structures utilized by the aforementioned components of the example deployment manager (200). Each component of the example deployment manager (200) is discussed below.

In one or more embodiments of the invention, the script generator (210) generates a script used to configure one or more computing devices of a deployment (e.g. 130, FIG. 1). The script generator (210) may generate the script by: (i) obtaining information regarding a to-be-configured deployment, (ii) obtaining configuration actions associated with the obtained information regarding the to-be-configured deployment, (iii) ordering the configuration actions based on dependencies of the obtained configuration actions, and (iv) generating the script using the ordered configuration actions. To generate a script, the script generator (210) may invoke the functionality of the dependency analyzer (212) and/or deployment manifest repository parser (214).

In one or more embodiments of the invention, a configuration action is an act that modifies hardware, firmware, firmware settings, and/or an application of a computing device. A configuration action may be, for example, disabling of a network adapter, loading a different version of firmware, or changing firmware timing setting. The configuration action may be different actions that modify hardware, firmware, firmware settings, and/or an application of a computing device without departing from the invention.

In one or more embodiments of the invention, the script generator (210) is a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the script generator (210) described throughout this application and/or all or a portion of the methods illustrated in FIGS. 4A-4D.

In one or more embodiments of the invention, the script generator (210) is implemented as computer instructions (e.g. computer code) stored on a persistent storage that when executed by a processor of the example deployment manager (200) cause the example deployment manager (200) to provide the functionality of the script generator (210) described throughout this application and/or all or a portion of the methods illustrated in FIGS. 4A-4D.

In one or more embodiments of the invention, the dependency analyzer (212) obtains dependency data and generates a dependency graph (226) using the obtained dependency data. As used herein, dependency data refers to dependencies of configuration actions. In other words, a first configuration action may depend on a second configuration action having been performed prior to the performance of the second configuration action. The dependency graph (226) may be a representation of all of the dependencies of all of the configuration actions necessary to configure a deployment. The dependency data may be obtained from the deployment manifest repository parser (214). The dependency graph (226) may be stored in the persistent storage (220). For additional details regarding dependency data, See FIGS. 3A and 3C.

In one or more embodiments of the invention, the dependency analyzer (212) is a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the dependency analyzer (212) described throughout the application and/or all or a portion of the methods illustrated in FIGS. 4A-4D.

In one or more embodiments of the invention, the dependency analyzer (212) is implemented as computer instructions, e.g. computer code, stored on a persistent storage that when executed by a processor of the example deployment manager (200) cause the example deployment manager (200) to provide the functionality of the dependency analyzer (212) described throughout the application and/or all or a portion of the methods illustrated in FIGS. 4A-4D.

In one or more embodiments of the invention, the deployment manifest repository parser (214) parses data stored in the deployment manifest repository (222) to obtain configuration actions and/or dependency data. The deployment manifest repository parser (214) may parse the deployment manifest repository (222) and obtain the dependency data, configuration actions, and/or other information without departing from the invention. The configuration actions may be obtained from the deployment manifest repository (222) in the persistent storage (220) to be utilized by the script generator (210). The dependency data may be utilized by the dependency analyzer (212). The configuration actions may be utilized by the script generator (210).

In one or more embodiments of the invention, the deployment manifest repository parser (214) is a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the deployment manifest repository parser (214) described throughout the application and/or all or a portion of the methods illustrated in FIGS. 4A-4D.

In one or more of embodiments of the invention, the deployment manifest repository parser (214) is implemented as computer instructions, e.g. computer code, stored on a persistent storage that when executed by a processor of the example deployment manager (200) cause the example deployment manager (200) to provide the functionality of the deployment manifest repository parser (214) described throughout the application and/or all or a portion of the methods illustrated in FIGS. 4A-4D.

The persistent storage (220) may store data and may be, for example, hard disk drives, solid state drives, tape drives, or any combination thereof. The persistent storage (220) maybe other types of digital storage without departing from the invention. Additionally, the persistent storage (220) may store program code for user applications.

The persistent storage (220) may include data structures used by the script generator (210), the dependency analyzer (212), and/or the deployment manifest repository parser (214). The data structures may include a deployment manifest repository (222), a script code library (224), and/or a dependency graph (226). The persistent storage (220) may include additional, fewer, and/or different data structures without departing from the invention. Each of the aforementioned data structures is discussed below.

The deployment manifest repository (222) may be a data structure that includes deployment configuration information. The deployment configuration information may include configuration actions for any number and type of deployments. In other words, the deployment manifest repository (222) may include all of the configuration actions for all possible deployment configuration scenarios. A subset of the configuration actions may be obtained by the deployment manifest repository parser (214) for a corresponding deployment and, thereby, obtain all of the configuration actions required to configure the corresponding deployment. The obtained subset of the configuration actions may be provided to the script generator (210) which generates a script using the subset of configuration actions. The deployment manifest repository (222) may include additional information such as, for example, dependencies of configuration actions. For additional details regarding the deployment manifest repository (222), See FIG. 3A.

The script code library (224) may be a data structure that includes portions of script code. The portions of script code may be used by the script generator (210) to generate a script. The portions of script code in the script code library (224) may be associated with different configuration actions that may need to be performed to configure computing devices for a deployment. Thus, once the script generator (210) determines the configuration actions that need to be performed to generate a script, the script generator (210) may obtain corresponding portions of script code from the script code library (224) to generate a script for configuring computing devices of a deployment.

In one or more embodiments of the invention, the dependency graph (226) is a data structure that represents dependency chains of actions to be performed as part of a configuration. A dependency chain may be an ordering of configuration actions that must be performed for subsequently performed actions to be performed successfully. For example, a dependency chain may specify that a network adapter needs to be configured before a message may be sent to a second computing device using the network adapter as part of a configuration process. The dependency graph (226) may be used by the script generator (210) to order the portions of script in a generated script so that actions that need to be performed before other actions are completed before the other actions are performed. The dependency graph (226) may be generated by the dependency analyzer (212).

Figure 3A:
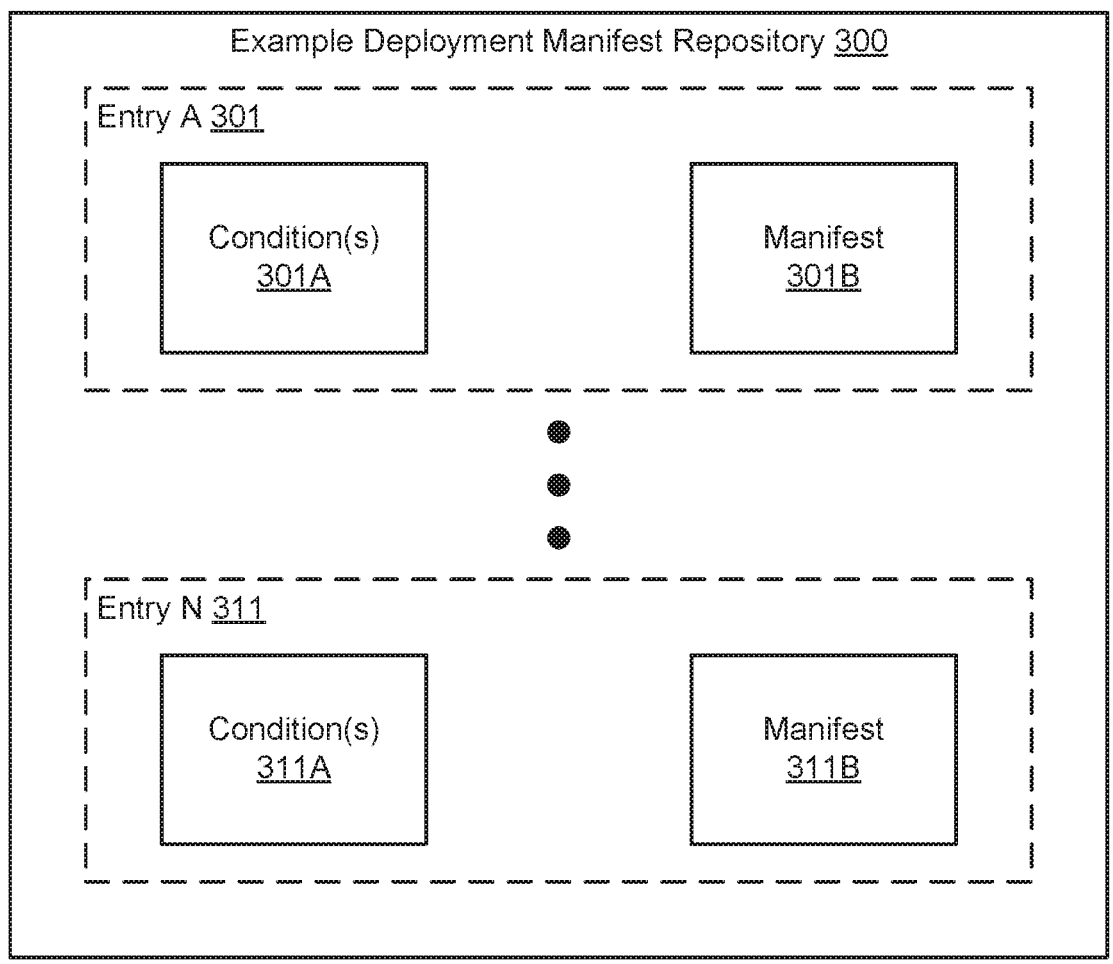
FIG. 3A shows a diagram of an example deployment manifest repository in accordance with one or more embodiments of the invention.

FIG. 3A shows the diagram of an example deployment manifest repository (300) in accordance with one or more embodiments of the invention. The deployment manifest repository (222, FIG. 2) discussed above may be similar to the example deployment manifest repository (300).

In one or more embodiments of the invention, the example deployment manifest repository (300) is a data structure that includes information used to generate a script, or other data structure, that may be used to configure a deployment. The example deployment manifest repository (300) may include a number of entries (301, 311). Each entry may include a manifest (e.g., 301B, 311B) and condition(s) (e.g., 301A, 311A) associated with the manifest of the entry. Each portion of the example deployment manifest repository (300) is discussed below.

In one or more embodiments of the invention, the condition(s) (301A, 311A) specify characteristics of a deployment. If a deployment has characteristics matching the conditions (301A, 311A), the associated manifest may be used to generate a script, or other data structure, to configure the deployment. For additional details regarding the condition(s) (301A, 311A), See FIG. 3B.

In one or more embodiments of the invention, the manifests (301B, 311B) include one or more tasks. The tasks may include configuration actions to be performed on a deployment. For additional information regarding the manifests (301B, 311B), See FIG. 3C.

Figure 3B:
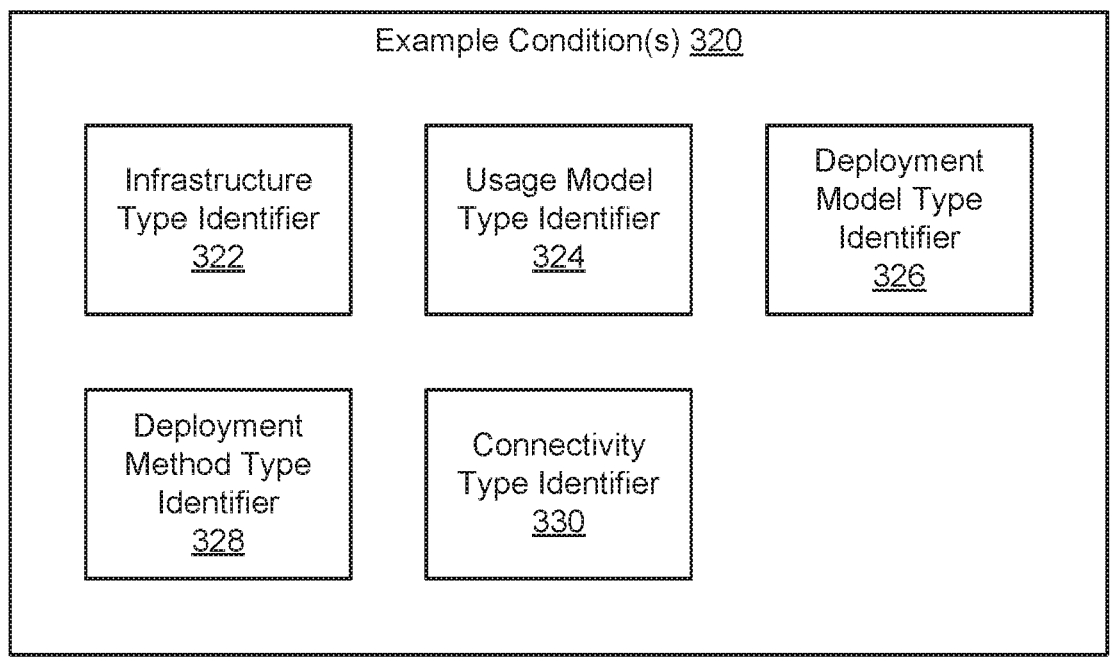
FIG. 3B shows a diagram of example conditions in accordance with one or more embodiments of the invention.

As discussed above, each of the entries of the example deployment manifest repository (300) may include conditions. FIG. 3B shows a diagram of example condition(s) (320) in accordance with one or more embodiments of the invention. The condition(s) (301A, 311A, FIG. 3A) discussed above may be similar to the example condition(s) (320).

In one or more embodiments of the invention, the example condition(s) (320) include an infrastructure type identifier (322), a usage model type identifier (324), a deployment model type identifier (326), a deployment method type identifier (328), and a connectivity type identifier (330). Each portion of the conditions is discussed below.

In one or more embodiments of the invention, the infrastructure type identifier (322) specifies a type of infrastructure of a deployment. The type of infrastructure of the deployment may be specified based on: (i) a functionality the deployment will provide when properly configured, (ii) a manner in which computing devices of the deployment operate, and/or (iii) underlying characteristics of the computing devices of the deployment. The type of infrastructure of the deployment may be, for example, a software-defined storage infrastructure type. A software defined storage infrastructure type may manage the storage of data by software executing on commodity hardware, as opposed to the storage of data using specially designed, custom hardware. The type of infrastructure of the deployment may be of other types without departing from the invention.

In one or more embodiments of the invention, the usage model type identifier (324) specifies a usage model of a deployment. The usage model may describe the physical relationships of computing devices of a deployment. The usage model may be, for example, a hyper-converged usage model or a disaggregated usage model. A hyper-converged usage model may refer to a deployment that includes a single physical device that hosts multiple computing devices, communication infrastructure, power supply infrastructure, and/or other portions of a computing system. A disaggregated usage model may refer to a deployment that divides computing resources into pools, via any combination of hardware and software orchestration. The usage model types may be other types of usage models without departing from the invention.

In one or more embodiments of the invention, a hyper converged usage model refers to virtualized compute and storage functions running within a computing device, such as a server with internal disk drives. In contrast, a disaggregated model in accordance with one or more embodiments of the invention refers to compute and storage functions running separately in a computing and storage devices respectively, e.g., traditional compute and storage resources connected via fiber channel or small computer systems interface. The compute and storage resources may be virtualized but are executing using separate physical computing resources.

In one or more embodiments of the invention, the deployment model type identifier (326) specifies a deployment model of a deployment. The deployment model may be static or dynamic. In other words, the deployment model type specifies whether there is an expectation that the deployment will be modified in the future. For example, a remote office branch deployment model may not be expected to change in the future if the office is not expected to grow. In contrast, a dynamic deployment may be expected to grow in the number of devices in the future and, consequently, make selecting certain types of configuration actions, over other types of configuration actions, advantageous.

In one or more embodiments of the invention, the deployment method type identifier (328) specifies a manner in which a deployment will be configured. The manner in which a deployment is configured may be, for example, via a software deployment solution that interfaces between computing systems of a deployment or via direct deployment via individual computing devices. For example, a direct deployment method may include all of the software necessary to configure each individual computing device. In contrast, a software deployment solution method may include software such as, for example, a system center virtual machine manager (SCVMM) to operate one or more computing devices in a deployment. Other software may be used without departing from the invention.

In one or more embodiments of the invention, the connectivity type identifier (330) specifies a connectivity model between computing devices of a deployment. The connectivity model may refer to the method in which computing devices communicate with each other in the deployment. For example, a fully converged connectivity model may specify that all of the computing devices in a deployment in a single network are operably connected to each other. In contrast, in a heterogeneous connectivity model different computing devices of a deployment may only be operably connected with different subsets of all of the computing devices of the deployment.

Figure 3C:
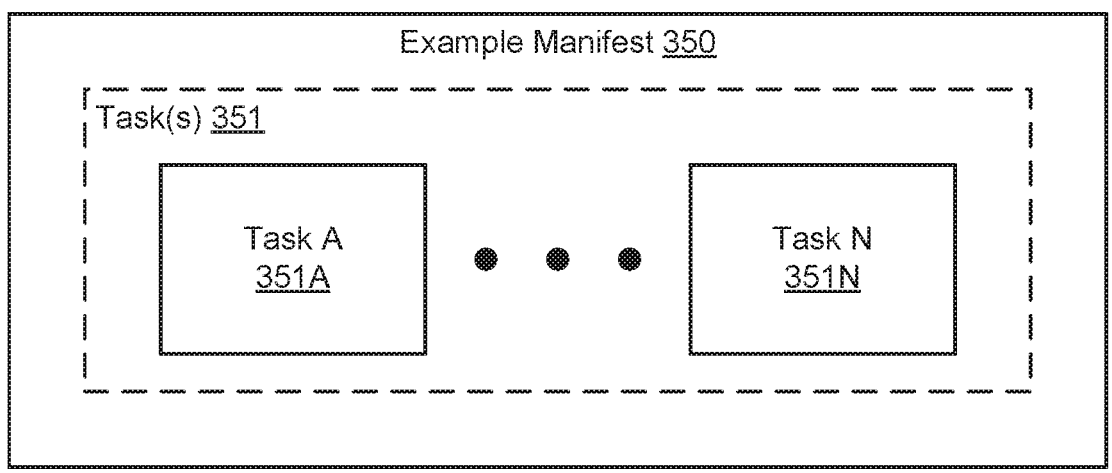
FIG. 3C shows a diagram of an example manifest in accordance with one or more embodiments of the invention.

FIG. 3C shows a diagram of an example manifest (350) in accordance with one or more embodiments of the invention. The manifests (301B, 311B) discussed above may be similar to the example manifest (350).

The example manifest (350) may include a set of one or more task(s) (351) that are to be performed in a deployment configuration scenario. Each task (351A, 351N) may include information such as dependency data and configuration actions that may be used by the script generator (210, FIG. 2) and/or the dependency analyzer (212, FIG. 2). For additional details regarding tasks, See FIG. 3D.

Figure 3D:
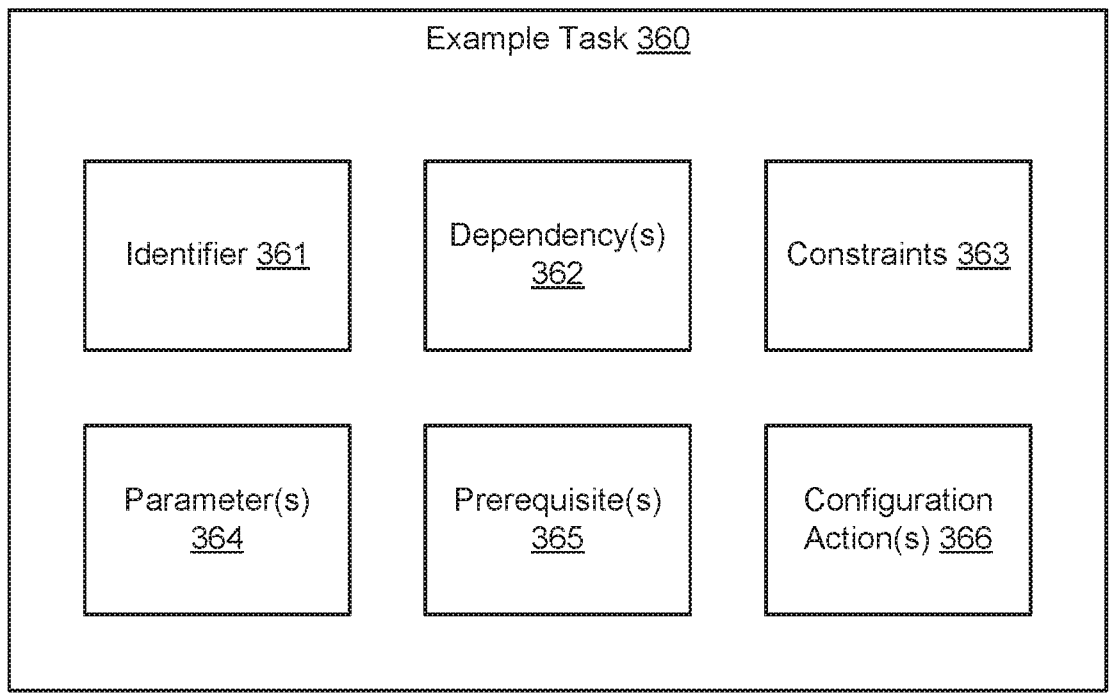
FIG. 3D shows a diagram of an example task in accordance with one or more embodiments of the invention.

FIG. 3D shows a diagram for an example task (360) in accordance with one or more embodiments of the invention. The tasks (351A, 351N, FIG. 3C) discussed above may be similar to the example task (360).

In one or more embodiments of the invention, the example task (360) includes information such as an identifier (361), dependency(s) (362), constraint(s) (363), parameter(s) (364), prerequisite(s) (365), and/or configuration action(s) (366). Each portion of the example task (360) is discussed below.

In one or more embodiments of the invention, the identifier (361) identifies the task. The identifier may be, for example, the name of the task, a uniform resource identifier, and/or a description of the task. The identifier (361) may distinguish the task from all other tasks. The identifier (361) may be utilized by the deployment manifest repository parser (214, FIG. 2).

In one or more embodiments of the invention, the dependency(s) (362) specify the dependencies of a configuration action (366) on other configuration action(s) (366). In other words, the dependency(s) (362) specify whether one or more other configuration action(s) (366) need to be completed before a corresponding configuration action (366) may be performed. The dependency(s) (362) may be utilized by the dependency analyzer (212, FIG. 2) as discussed above.

In one or more embodiments of the invention, the constraint(s) (363) specify whether the example task (360) applies to a deployment configuration. For example, some tasks may not be required for a deployment. In a scenario in which the example task (360) does not apply, the example task may not be performed.

The inclusion of constraint(s) (363) may cause the script generator to generate a corresponding check in a generated script. The check, if failed, may cause the script to terminate execution of the script. If the check is passed, the script may continue execution.

For example, a task may configure a quality of service (QoS) policy for a computing device. As used herein, a QoS policy may refer to the management of network traffic in a deployment. The constraint(s) (363) may cause the script generator to insert a check of an assumption of the configuration of a network adapter in a computing device of the deployment. If the check establishes that the assumption of the configuration of the network adapter was correct, then the QoS policy configuration task may be performed. The constraint(s) (363) may be utilized by the script generator (210, FIG. 2).

In one or more embodiments of the invention, the parameter(s) (364) specify inputs needed in order for the configuration action(s) (366) to be performed. The parameter(s) (364) may be obtained from, for example, the to-be-configured deployment or a system administrator managing the to-be-configured deployment. The parameter(s) may be utilized by the script generator (210, FIG. 2) when generating a script or other data structure.

The inclusion of parameter(s) (364) in a task may cause a script generator to generate a portion of a script to obtain the parameters. The portion of the script for obtaining the parameter(s) (364) may, for example, generate an input box for entry of the parameters by a system administrator, send requests to one or more computing devices of the deployment to obtain the parameters, or perform other actions to obtain data associated with the parameters. Other portions of a task may utilize the parameter(s) (364).

In one or more embodiments of the invention, the prerequisite(s) (365) specify checks for determining whether a configuration action (366) may be performed for a deployment. The prerequisite(s) (365) cause checks of an assumption of the configuration actions (366) to be inserted into a script. If the check establishes that an assumption was incorrect, the prerequisites may perform additional actions, such as, for example, sending an error message, before allowing the configuration action(s) (366) to be performed.

The inclusion of prerequisite(s) (365) may cause the script generator to generate a corresponding check in a generated script. The check, if failed, may cause the script generator to perform a modified script when continuing execution of the script after the check. If the check is passed, the script may continue executing the unmodified script. The modified script may, for example, perform a different function than the unmodified script such as sending an error message to a user.

In one or more embodiments of the invention, the configuration action(s) (366) specify actions to be performed to configure a deployment. In other words, the configuration actions may each be a high level description of an act of configuring a portion of a deployment. For example, for configuration of a QoS policy, the configuration action(s) (366) may include creating a QoS policy, enabling/disabling network QoS flow control, and/or enabling network adapter QoS on physical devices. The configuration actions included in the configuration action(s) (366) may be utilized by the script generator (210, FIG. 2).

While the data structures shown in FIG. 3A-3D are illustrated as separate, individual structures, the data structures may be divided into any number of data structures, combined with other data structure or each other, or otherwise modified in structure without departing from the invention.

As discussed above, the example deployment manager (200, FIG. 2) may perform methods for generating a script, or other data structure for configuring a deployment, based on information found in the deployment manifest repository (222, FIG. 2) and/or other relevant information.

Figure 4A:
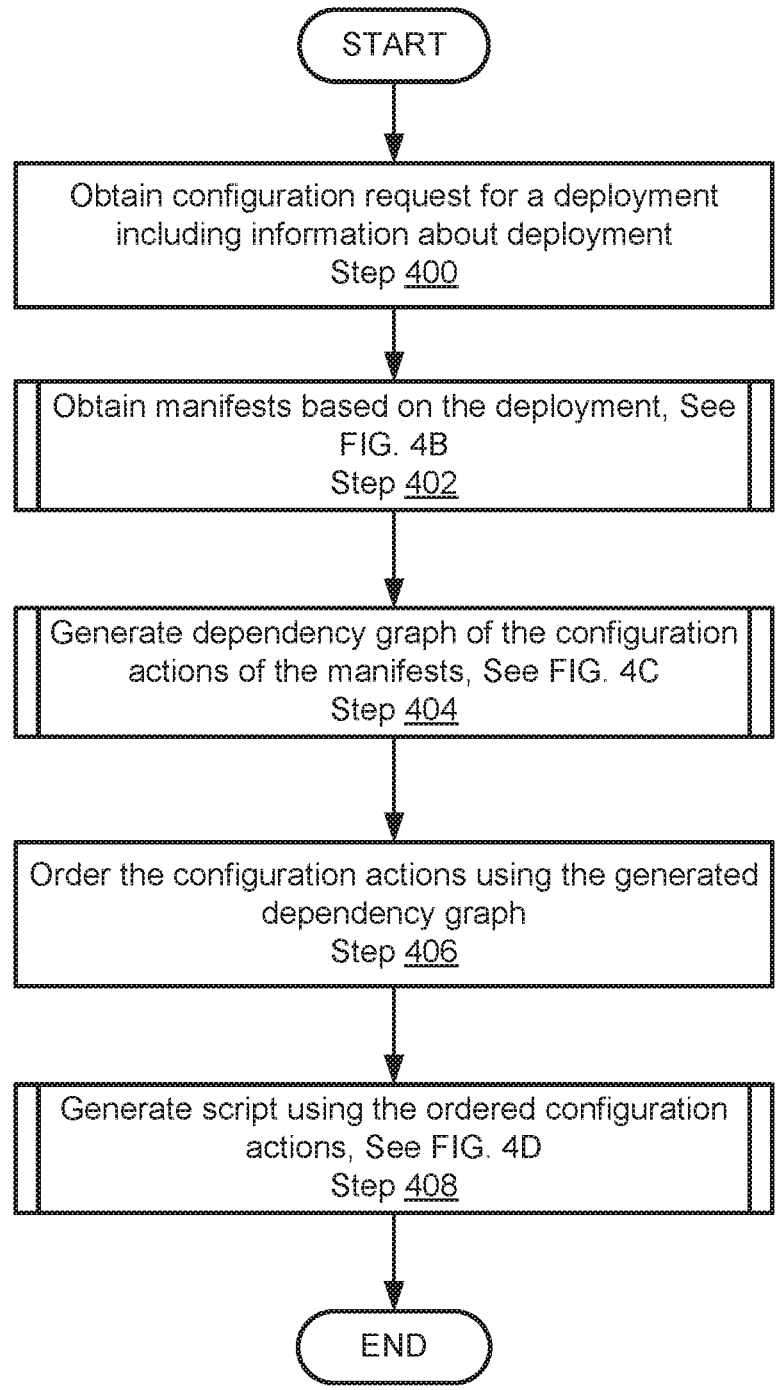
FIG. 4A shows a flowchart of a method of configuring a deployment in accordance with one or more embodiments of the invention.

FIG. 4A shows a flowchart of a method in accordance with one or more embodiments of the invention. The method depicted in FIG. 4A may be used to configure a deployment in accordance with one or more embodiments of the invention. The method shown in FIG. 4A may be performed by, for example, a deployment manager (e.g. 200, FIG. 2). Other components of the system illustrated in FIG. 1 may perform the method of FIG. 4A without departing from the invention.

In Step 400, a configuration request for a deployment is obtained including information about the deployment.

In one or more embodiments of the invention, the configuration request is obtained from a computing device. In one or more embodiments of the invention, the computing device is a coordination point (120, FIG. 1). In one or more embodiments of the invention, the computing device is a computing device (110A, 110N, FIG. 1) of a distributed system (110, FIG. 1). The computing device may be other elements of a distributed system without departing from the invention.

In one or more embodiments of the invention, the information about the deployment may be characteristics of the deployment such as, for example, a type of infrastructure the deployment is intended to be, a usage model for the deployment, a deployment model for the deployment, etc. The information about the deployment may be matched to conditions (e.g., 301A, 311A, FIG. 3A) as part of a data structure generation process, as will be discussed below.

The deployment may be, for example, a deployment similar to that shown in FIG. 1. The deployment may be other types of deployments without departing from the invention.

In Step 402, manifests are obtained using the information about the deployment.

In one or more embodiments of the invention, the manifests are obtained by matching the deployment information to conditions. The conditions may be associated with corresponding manifests. Any number of manifests may be obtained based on the matching.

The obtained manifests may include tasks. The tasks of an obtained manifest may include configuration actions and/or dependencies of each configuration action, in addition to other information.

Figure 4B:
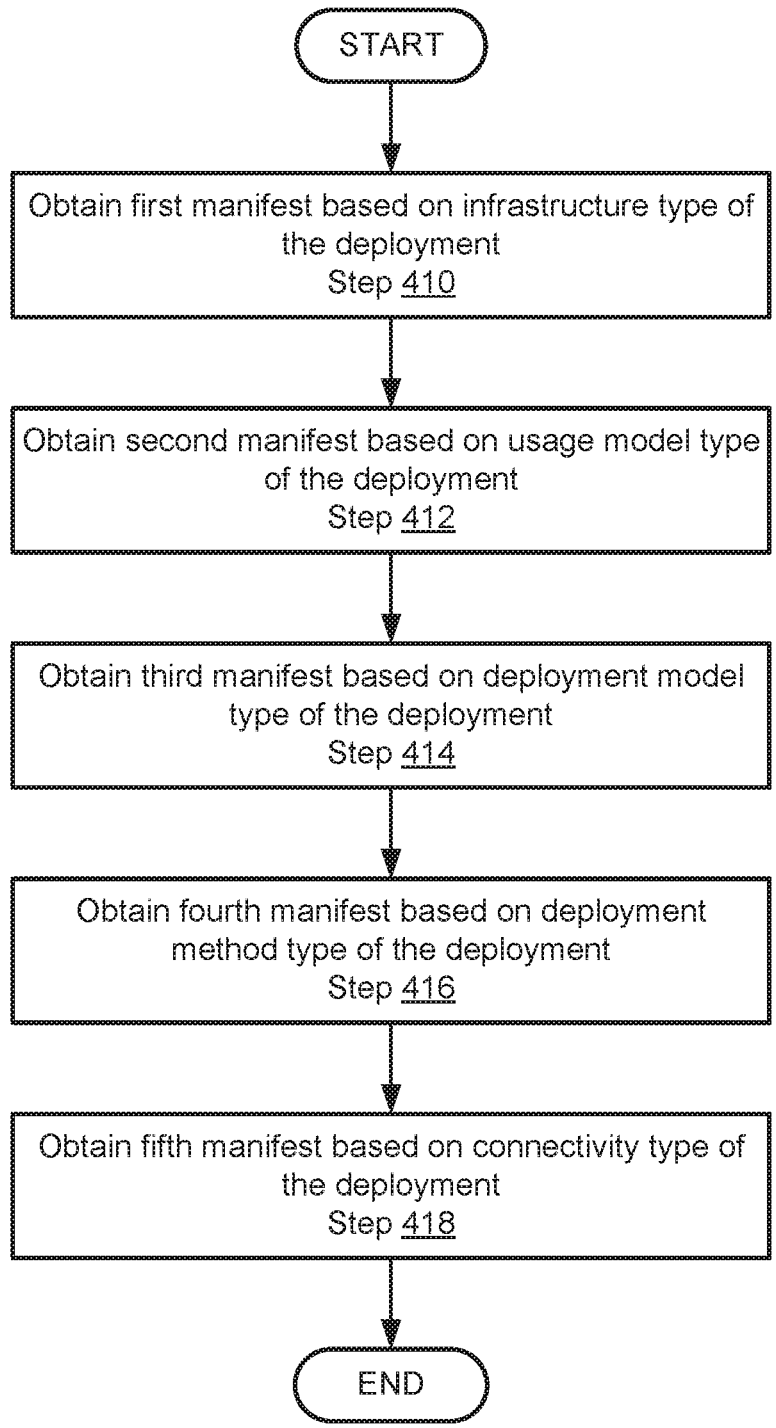
FIG. 4B shows a flowchart of a method of obtaining manifests in accordance with one or more embodiments of the invention.

In one or more embodiments of the invention, the manifests are obtained via the method illustrated in FIG. 4B. The manifests may be obtained via other methods without departing from the invention.

In Step 404, a dependency graph of the configuration actions of the identified manifests is generated.

In one or more embodiments of the invention, the dependency graph may be similar to the dependency graph (e.g., 226, FIG. 2) discussed above.

As discussed above, the manifests obtained in Step 402 may include both configuration actions and dependencies associated with the configuration actions. Each of the dependencies may specify one or more other configuration actions that must be performed before the configuration action associated with the respective dependency may be performed.

In one or more embodiments of the invention, the dependency graph is generated by identifying all of the configuration actions having dependencies. Each of the identified configuration actions are linked to other identified configuration actions based on the dependencies. The process of linking the configuration actions may generate dependency chains. In other words, a first configuration action may be linked to a second configuration action based on a dependency of the first configuration, a third configuration action may be linked to a second configuration action based on a dependency of the second configuration action, etc. The process may repeat to generate dependency chains of any length.

In some cases, multiple unlinked dependency chains may be generated. In other words, some groups of configuration actions may be portions of different dependency chains. For example, a first configuration action may be linked to a second configuration action based on a dependency of the first configuration action, a third configuration action may be linked to a fourth configuration action based on a dependency of the third configuration action, etc.

In further cases, some configuration actions may not be dependent upon other configuration actions. In other words, some configuration actions may be performed at any time without consideration of the state of other components of a to-be-configured distributed system.

Thus, when generating a dependency graph, the dependency graph may have portions that reflect independent configuration actions, singularly dependent configuration actions, and chains of configuration actions.

In one or more embodiments of the invention, the dependency graph is generated via the method illustrated in 4C. The dependency graph may be generated via other methods without departing from the invention.

In Step 406, the configuration actions are ordered using the generated dependency graph.

In one or more embodiments of the invention, the configuration actions of the obtained manifests are ordered by the script generator. The configuration action(s) of the obtained manifests may be ordered using the dependency graph so that the configuration action(s) are performed in the order that is specified by the dependency graph.

In one or more embodiments of the invention, the script generator orders the group of configuration action(s) that do not include dependencies so that the configuration actions are performed before other configuration actions that include dependencies are performed. Each of the configuration actions of the group may be ordered within the group in any manner without departing from the invention.

In one or more embodiments of the invention, the group of configuration action(s) that each depend on other configuration action(s) are ordered as specified by the dependency graph. In other words, configuration actions of the group are ordered to reflect the chains specified by the dependency graph. Independent chains may be placed in any order with respect to other chains without departing from the invention.

In Step 408, a script is generated using the ordered configuration actions.

In one or more embodiments of the invention, the generated script includes script code that, when executed, performs the configuration action(s) of each task of the obtained manifests in an order specified by the dependency graph. The generated script may be generated by the script generator (210, FIG. 2).

In one or more embodiments of the invention, each configuration action has an associated fragment of script code. The script generator (210, FIG. 2) may obtain the fragment of script code for a configuration action and modify the fragment of script code based on the constraints (e.g., 363, FIG. 3D), parameters (e.g., 364, FIG. 3D), and prerequisites (e.g., 365, FIG. 3D) associated with the configuration action. The process of obtaining a fragment of script code and modifying the fragment of script code may be repeated for each configuration action of the obtained manifests. The fragments of script code may be appended to each other to form a generated script.

In one or more embodiments of the invention, each obtained fragment of script code is modified based on the constraints (e.g., 363, FIG. 3D) of the configuration action associated with the respective obtained fragment of script code. The modification of each obtained fragment of script code may include adding a constraint check to the respective obtained fragment of script code. The constraint check may determine whether a computing device, or other element of a deployment, is in a predetermined state. If the computing device is in a predetermined state, the constraint check allows the remaining portion of the respective obtained fragment of script code to be performed. If the computing device is not in a predetermined state, the constraint check forces the remaining portion of the respective obtained fragment of script code to be skipped.

In one or more embodiments of the invention, each obtained fragment of script code is modified based on the parameters (e.g., 364, FIG. 3D) of the configuration action associated with the respective obtained fragment of script code. The modification of each fragment of script code may include adding a portion for obtaining user, or other, input. The portion for obtaining user, or other, input may obtain data to supply to variables in other portions of the respective obtained fragment of script code. The portion for obtaining user, or other, input may cause, for example, an input field to be displayed to a user. The user may then supply an input which is used by the remaining portions of the respective obtained fragment of script code during its execution.

In one or more embodiments of the invention, each obtained fragment of script code is modified based on the prerequisites (365, FIG. 3D) of the configuration action associated with the respective obtained fragment of script code. The modification of each obtained fragment of script code may include adding a prerequisite check to the respective obtained fragment of script code. The prerequisite check may determine whether a computing device, or other element of a deployment, is in a predetermined state. If the computing device is in a predetermined state, the prerequisite check may allow the remaining portion of the respective obtained fragment of script code to be performed, i.e., executed by a processor. If the computing device is not in a predetermined state, the prerequisite check may modify the remaining portions of the respective obtained fragment of script code and allow the modified remaining portions of the respective obtained fragment of script code to be performed. The remaining portions of the respective obtained fragment of script code may be modified to, for example, display an error, pause execution of the script, send a message, or perform any other function. In other words, when a prerequisite check is not met the remaining portion of the respective obtained fragment of script code may perform a different function than the respective obtained fragment of script code performs when the prerequisite check is met.

In one or more embodiments of the invention, the script is generated via the method illustrated in 4D. The script may be generated via other methods without departing from the invention.

The method may end following Step 408.

As discussed above, the deployment manifest repository parser (214, FIG. 2) may obtain manifests from a deployment manifest repository when invoked by a script generator of a deployment manager.

FIG. 4B shows a flowchart of a method in accordance with one or more embodiments of the invention. The method used in FIG. 4B may be used to obtain manifests in accordance with one or more embodiments of the invention. The method shown in FIG. 4B may be performed by, for example, the deployment manifest repository parser (214, FIG. 2) of a deployment manager. Other component of the system illustrated in FIG. 1 may perform the method of FIG. 4B without departing from the invention.

In Step 410, a first manifest is obtained based on an infrastructure type of the deployment.

In one or more embodiments of the invention, the first manifest is obtained by matching an infrastructure type of the deployment to an entry of a deployment manifest repository having a single condition that matches the infrastructure type of the deployment.

In one or more embodiments of the invention, the deployment manifest repository parser (214, FIG. 2) uses the infrastructure type included in the obtained configuration request to parse the deployment manifest repository (e.g., 222, FIG. 2) to obtain a manifest that has associated conditions that match the infrastructure type of the deployment.

In Step 412, a second manifest is obtained based on a usage model type of the deployment.

In one or more embodiments of the invention, the second manifest is obtained by matching the infrastructure type of the deployment and the usage model to an entry of a deployment manifest repository having two conditions that match the aforementioned type and model.

In one or more embodiments of the invention, the deployment manifest repository parser (214, FIG. 2) uses the infrastructure type and the usage model included in the obtained configuration request and parses the deployment manifest repository (e.g., 222, FIG. 2) to obtain a manifest that has conditions that match the infrastructure type and the usage model type.

In Step 414, a third manifest is obtained based on a deployment model type of the deployment.

In one or more embodiments of the invention, the third manifest is obtained by matching the infrastructure type, usage model, and deployment model of the deployment to an entry of a deployment manifest repository having three conditions that match the aforementioned type and models.

In one or more embodiments of the invention, the deployment manifest repository parser (214, FIG. 2) uses the deployment model, the usage model, and the infrastructure type included in the obtained configuration request to parse the deployment manifest repository (e.g., 222, FIG. 2) to obtain a manifest that has conditions that match the deployment model type, the usage model type, and the infrastructure type.

In Step 416, a fourth manifest is obtained based on a deployment method type of the deployment.

In one or more embodiments of the invention, the fourth manifest is obtained by matching the infrastructure type, the usage model, the deployment model, and the deployment method type of the deployment to an entry of a deployment manifest repository having four conditions that match the aforementioned type, models, and method.

In one or more embodiments of the invention, the deployment manifest repository parser (214, FIG. 2) uses the infrastructure type, usage model, and deployment model and deployment method type of the deployment from the obtained configuration request to parse the deployment manifest repository (e.g., 222, FIG. 2) to obtain the manifest that has conditions that match the infrastructure type, usage model, and deployment model and deployment method type.

In Step 418, a fifth manifest is obtained based on a connectivity type of the deployment.

In one or more embodiments of the invention, the fifth manifest is obtained by matching the infrastructure type, the usage model, the deployment model, deployment method type, and connectivity type of the deployment to an entry in the deployment manifest repository having five conditions that match the aforementioned types, models, and method.

In one or more embodiments of the invention, the deployment manifest repository parser (214, FIG. 2) uses the infrastructure type, usage model, deployment model, deployment method type, and connectivity type of the deployment from the obtained configuration request to parse the deployment manifest repository (e.g., 222, FIG. 2) to obtain the manifest that has conditions that match the infrastructure type, usage model, deployment model, deployment method type, and connectivity type.

The method may end following Step 418.

As discussed above, the dependency analyzer (212, FIG. 2) may perform methods for generating a dependency graph (226, FIG. 2).

Figure 4C:
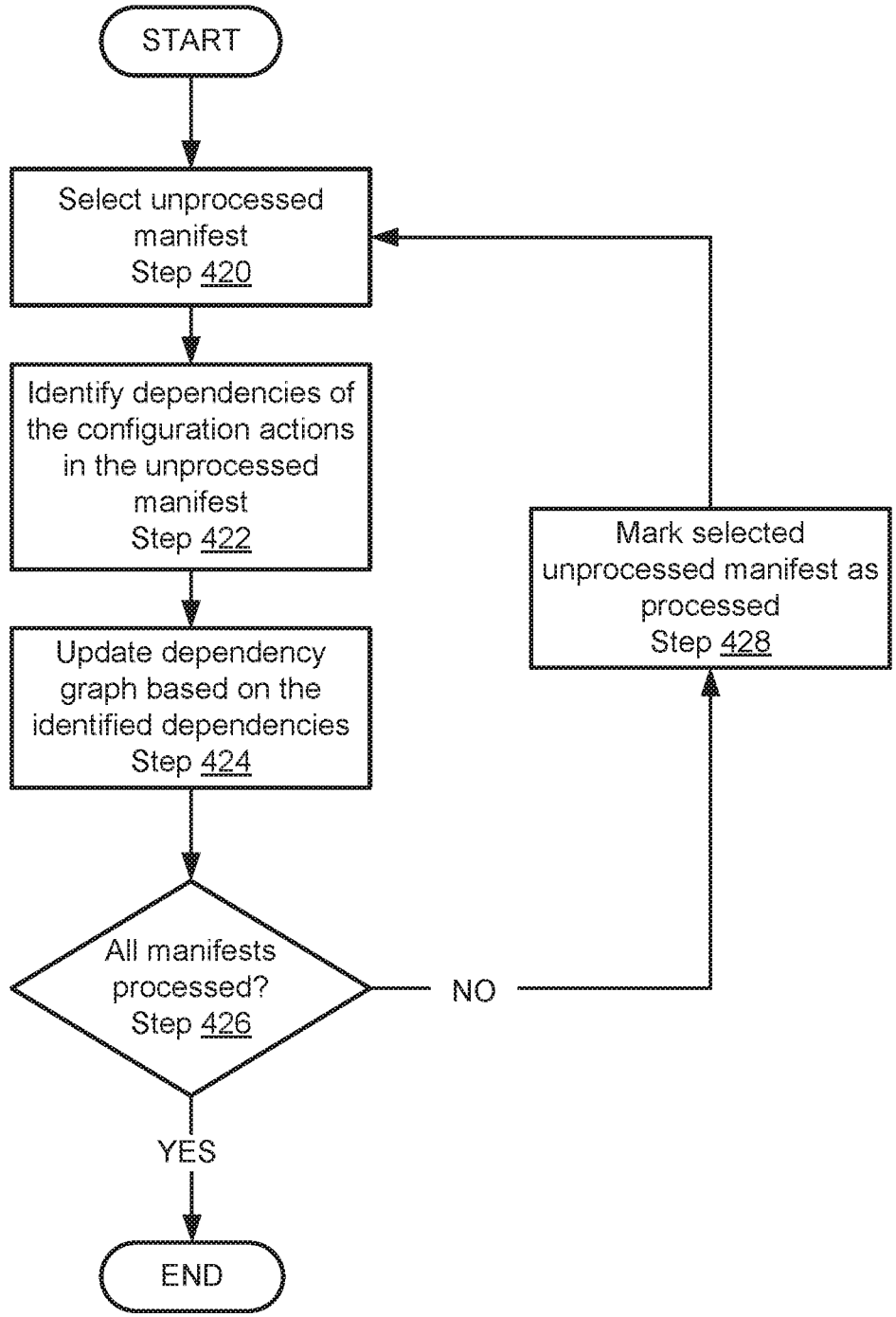
FIG. 4C shows a flowchart of a method of generating a dependency graph in accordance with one or more embodiments of the invention.

FIG. 4C shows a flowchart of a method in accordance with one or more embodiments of the invention. The method depicted in FIG. 4C may be used to generated a dependency graph in accordance with one or more embodiments of the invention. The method shown in FIG. 4C may be performed by, for example, a dependency analyzer (212, FIG. 2) of a deployment manager. Other components of the system illustrated in FIG. 1 may perform the method of FIG. 4C without departing from the invention.

In Step 420, an unprocessed manifest is selected.

In one or more embodiments of the invention, the unprocessed manifest is obtained from the obtained manifests discussed in FIG. 4A. In one or more embodiments of the invention, all of the manifests obtained in Step 402 of FIG. 4A are considered to be unprocessed when the method in FIG. 4C is initiated.

In Step 422, dependencies of the configuration actions in the unprocessed manifest are identified.

In one or more embodiments of the invention, the unprocessed manifest includes one or more tasks. The tasks may include configuration actions and associated dependencies. The dependencies may be similar to the dependency(s) (362, FIG. 3D) discussed above. The dependencies of a configuration action may specify other configuration actions in a task that need to be performed before the configuration action may be performed.

In Step 424, a dependency graph is updated based on the identified dependencies.

In one or more embodiments of the invention, the dependency graph is a data structure that specifies an ordering of any number of configuration actions.

In one or more embodiments of the invention, the dependency graph is updated by adding data to the dependency graph that links the configuration actions of the selected unprocessed manifest to other configuration actions based on the identified dependencies. If a configuration action of the selected unprocessed manifest is dependency free, the configuration action may not be linked to other configuration actions. In other words, data may not be added to the dependency graph for dependency free configuration actions.

In one or more embodiments of the invention, adding data to the dependency graph may generate a dependency chain. In other words, adding data to the dependency graph may result in a first configuration action being linked to a second configuration action based on a dependency of the first configuration and the second configuration action may be linked to a third configuration action based on a dependency of the second configuration action thereby generating a chain of three dependency actions.

In one or more embodiments of the invention, the process of updating the dependency graph by adding data to the dependency graph is repeated for each configuration action of the selected unprocessed manifest.

In Step 426, it is determined whether all unprocessed manifests have been processed. If all of the unprocessed manifests have been processed, the method may end following Step 426. If all of the unprocessed manifests have not been processed, the method proceeds to Step 428.

In Step 428, the selected unprocessed manifest is marked as processed.

The method may proceed to Step 420 following Step 428.

As discussed above, the script generator (210, FIG. 2) may generate a script using configuration actions.

Figure 4D:
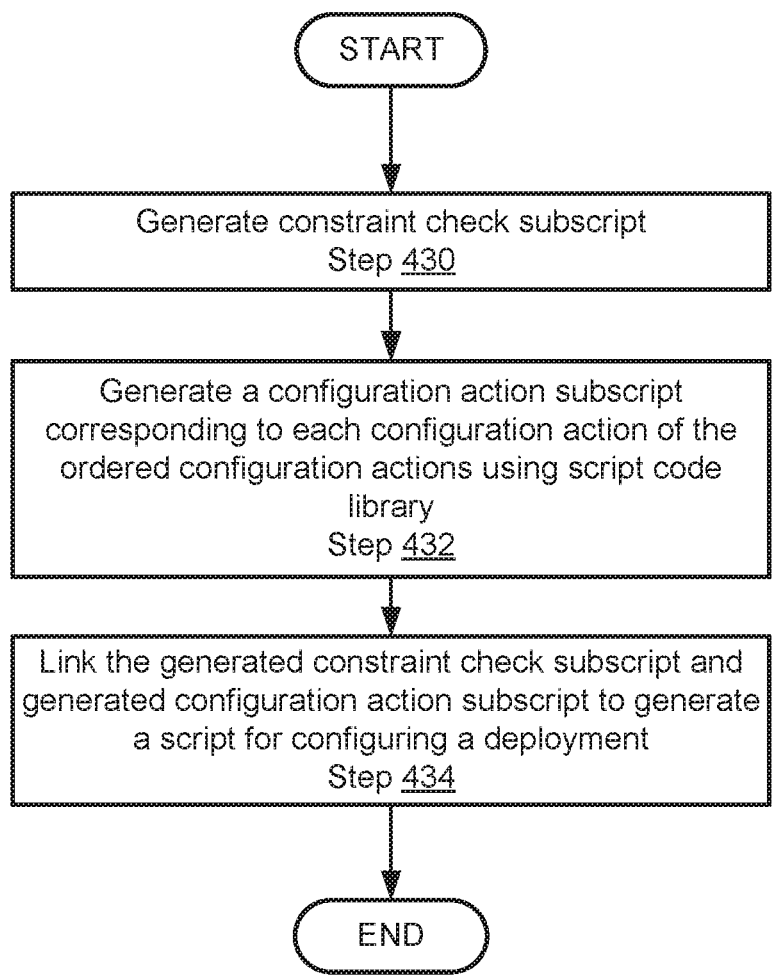
FIG. 4D shows a flowchart of a method of generating a script for configuring a deployment in accordance with one or more embodiments of the invention.

FIG. 4D shows a flowchart of a method in accordance with one or more embodiments of the invention. The method used in FIG. 4D may be used to generate a script in accordance with one or more embodiments of the invention. The method shown in FIG. 4D may be performed by, for example, a script generator (210, 4D) of a deployment manager. Other components of the system illustrated in FIG. 1 may perform the method of FIG. 4D without departing from the invention.

In Step 430, a constraint check subscript is generated.

In one or more embodiments of the invention, the constraint check subscript is a fragment of script code that, when executed, determines if a deployment is in a predetermined state. The constraint check subscript may reflect all of the constraints associated with all of the configuration actions of the obtained manifests of Step 402 of FIG. 4A. In other words, the constraint check subscript may be an aggregate check.

In Step 432, a configuration action subscript corresponding to each configuration action of the ordered configuration actions is generated using a script code library.

In one or more embodiments of the invention, the configuration action subscript is a portion of script code that includes one or more fragments of script code. Each fragment of script code may correspond to a configuration action of the ordered configuration actions discussed in FIG. 4A. The fragments of script code may be obtained from the script code library (e.g., 224, FIG. 2) of the deployment manager.

In one or more embodiments of the invention, the configuration action subscript is generated by ordering fragments of script code that corresponds to all of the ordered configuration action in an order specified by the ordered configuration actions. For example, a first fragment of script code in a configuration action subscript may correspond to a first configuration action in ordered configuration actions, a second fragment of script code may correspond to a second configuration action in the ordered configuration actions, etc. The fragments of script code may be appended so that each fragment of script code may be executed in an order specified by the ordered configuration actions.

In Step 434, the generated constraint check subscript is linked to the generated configuration action subscript to generate a script for configuring a deployment.

In one or more embodiments of the invention, the generated script for configuring a deployment includes the constraint check subscript and the generated configuration action subscript. Linking the constraint check subscript to the configuration action subscript may cause an entity executing the generated script to first perform the functionality of the constraint check subscript before performing the functionality of the configuration action subscript. By performing the functionality of the constraint check subscript before the functionality of configuration action subscript, the generated script may cause the entity executing the generated script to first verify that the deployment meets the constraints before any changes are made to the deployment. For example, a configuration action included in the configuration action subscript that requires a computing device to be in a predetermined state may not be executed if the computing device is not in the predetermined state as specified by the constraint check subscript.

The method may end following Step 434.

To further clarify embodiments of the invention, an example of a system is provided below. The provided example is non-limiting.

EXAMPLE 1

Figure 5A:
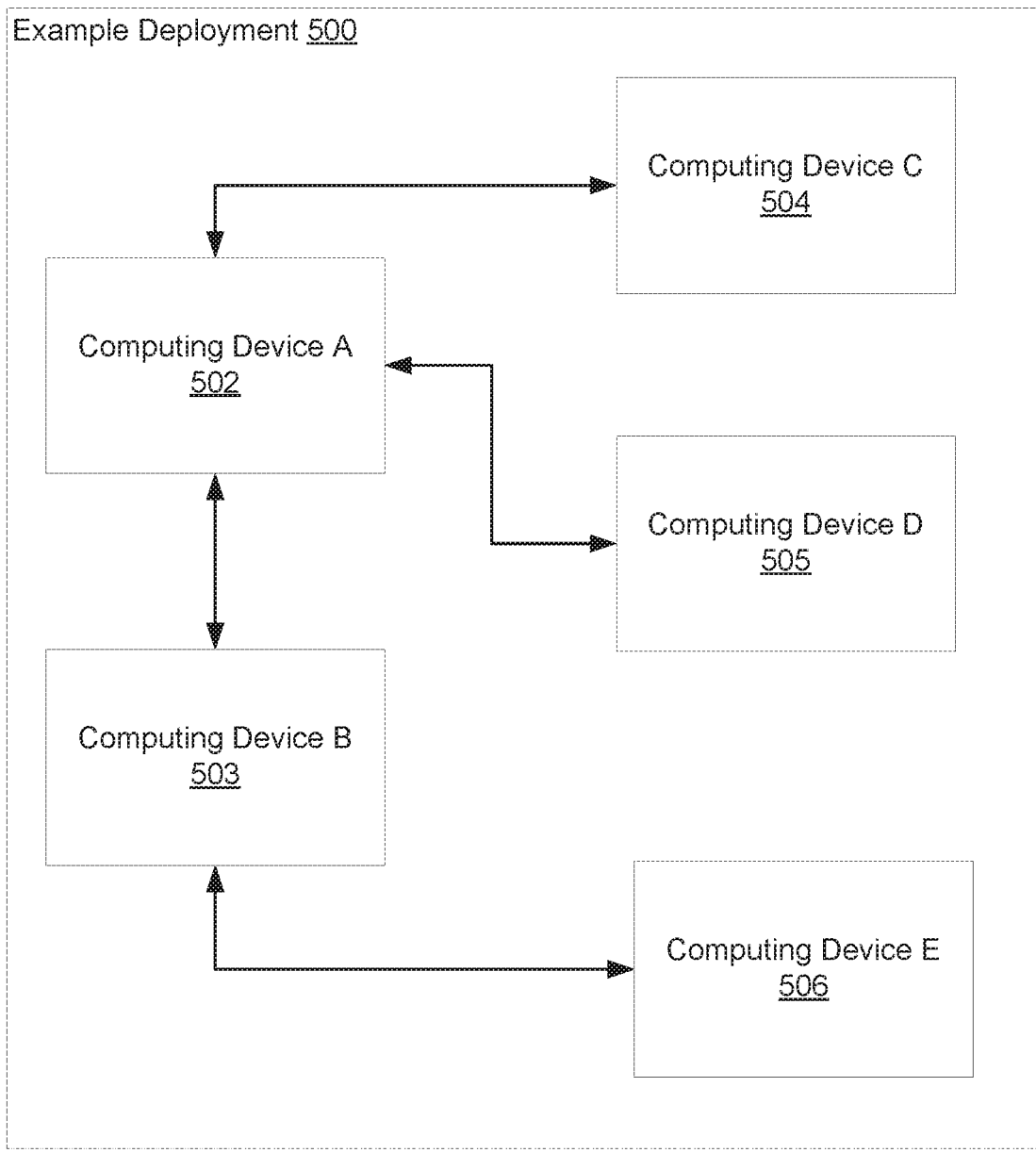
FIG. 5A shows a diagram of an example deployment before being configured.

Consider a scenario in which an example deployment including five computing devices is shipped to a deployment location. After shipping, the computing devices of the example deployment are unpacked and setup. FIG. 5A shows a diagram of the example deployment (500) in a pre-configuration state. As seen from FIG. 5A, the deployment may include computing devices A-E (502, 503, 504, 505, 506).

After setup of the deployment, computing device A (502) may be operably connected to computing device B (503), computing device C (504), and computing device D (505). Computing device B (503) may be operably connected to computing device E (506). Each of the operable connections in the deployment may be wired and/or wireless and are indicated by the double ended arrows in FIG. 5A.

Each operable connection in the example deployment (500) may be used to transfer data between the computing devices connected by the respective operable connection. For example, computing device A (502) may send and/or receive communications from computing device D (505) via the operable connection between the computing devices.

Once setup, a coordination point (not shown) obtains information about the example deployment (500) to initiate the process of configuring the example deployment (500). Based on the obtained information about the example deployment (500), configuration actions are obtained. FIG. 5B shows a list of the obtained configuration actions (510). The list of configuration actions may be a part of one or more obtained manifests, as discussed with respect to FIG. 4A. The obtained configuration actions (510) may be used as part of the process of generating a script which may, in turn, be used to configure the example deployment (500, FIG. 5A).

As seen from FIG. 5B, the first configuration action (512) specifies disabling of the connection between computing device A and computing device D. In contrast, the second configuration action (514) action specifies enabling the connection between computing device C and computing device D. Like the first configuration action (512), the third configuration action (516) specifies disabling the connection between computing device B and computing device E. Similar to the second configuration action (514), the fourth configuration action (518) specifies enabling the connection between computing device A and computing device E.

While not illustrated in FIG. 5B, the first configuration action (512) is dependent on the second configuration action (514). Similarly, the third configuration action (516) is dependent on the fourth configuration action (518). To facilitate ordering of the configuration actions based on the aforementioned dependencies, a dependency graph is generated.

FIG. 5C shows a diagram of an example dependency graph (520) generated based on the dependencies of the configuration actions, discussed above.

The example dependency graph (520) includes two dependency chains (521, 525). Dependency chain A (521) may represent the dependency of the first configuration action (522) on the second configuration action (524). Dependency chain B (525) may represent the dependency of the third configuration action (526) on the fourth configuration action (528).

After generating the example dependency graph (520), the configuration actions of FIG. 5B are ordered using the example dependency graph (520). After ordering the configuration actions, a script is generated using the ordered configuration actions. The script is then executed which configures the example deployment of FIG. 5A.

Figure 5D:
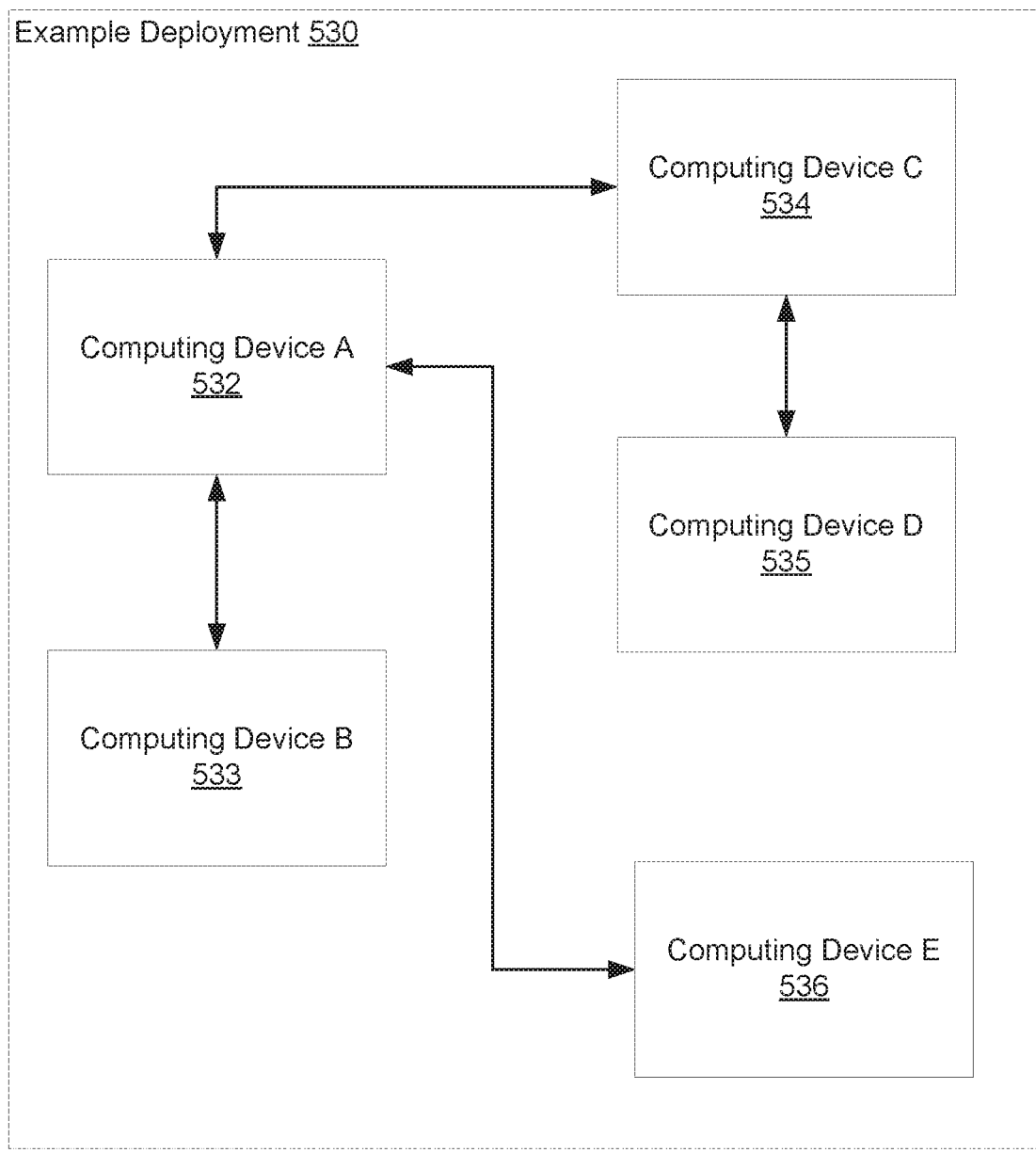
FIG. 5D shows a diagram of the example deployment of FIG. 5A after being configured.

FIG. 5D shows a diagram of the example deployment (530) of FIG. 5A in a post-configuration state. The example deployment (530) in the post-configuration state. As seen from FIG. 5D, executing the script reconfigured the connections between the computing devices (532, 533, 534, 535, 536) when compared to the connections in FIG. 5A. Specifically, computing device A (532) is operably connected to computing device B (533), computing device C (534), and computing device E (536). Computing device C may be operably connected to computing device E (536).

By reconfiguring the example deployment (530), each of the computing devices may be placed in states that enable the example deployment (530) to provide a predetermined functionality in an efficient manner.

End of Example 1

Figure 6:
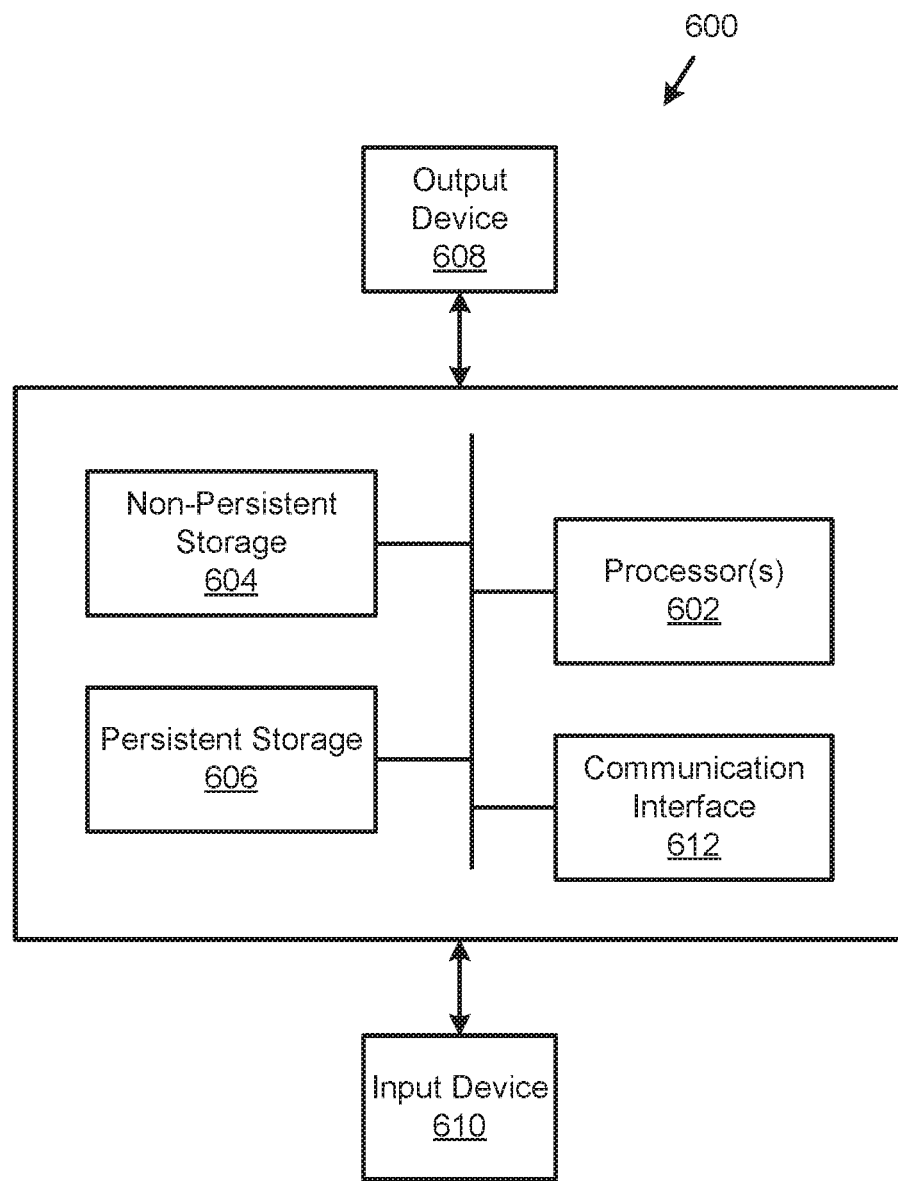
FIG. 6 shows a diagram of a computing device in accordance with one or more embodiments of the invention.

As discussed above, embodiments of the invention may be implemented using computing devices. FIG. 6 shows a diagram of a computing device in accordance with one or more embodiments of the invention. The computing device (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), input devices (610), output devices (608), and numerous other elements (not shown) and functionalities. Each of these components is described below.

In one embodiment of the invention, the computer processor(s) (602) may be an integrated circuit for processing instructions. For example, the computer processor(s) may be one or more cores or micro-cores of a processor. The computing device (600) may also include one or more input devices (610), such as a touchscreen, keyboard, mouse, microphone, touchpad, electronic pen, or any other type of input device. Further, the communication interface (612) may include an integrated circuit for connecting the computing device (600) to a network (not shown) (e.g., a local area network (LAN), a wide area network (WAN) such as the Internet, mobile network, or any other type of network) and/or to another device, such as another computing device.

In one embodiment of the invention, the computing device (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing devices exist, and the aforementioned input and output device(s) may take other forms.

Embodiments of the invention may improve the performance of computations, data storage, and/or communications in a deployment that includes distributed computing devices by improving the likelihood of configuring each of the computing devices of the deployment in a predetermined manner. More specifically, embodiments of the invention may improve the performance of computations, data storage, and/or communications by ensuring that the computing devices are configured to accomplish a predetermined goal. For example, when configuring multiple computing devices to perform a predetermined function it may be required to perform one or more actions before the performance of other actions. In a large deployment, there may be hundreds or thousands of dependencies that make manual configuration of each computing device fraught with potential for error.

Embodiments of the invention may reduce the likelihood of improperly configuring a computing device of a deployment by automating the process of deployment. By doing so, embodiments of the invention may ensure that a deployment is properly configured to perform a predetermined function. Accordingly, one or more embodiments of the invention address the problem of misconfigured computing devices in a deployment that may prevent the deployment from accomplishing a predetermined task. The aforementioned problem arises due to the nature of the technological environment in which deployments operate, that is, the large number of separate computing devices that must each be configured for the distributed system to accomplish its predetermined task.

While embodiments of the invention have been described as addressing one or more problems, embodiments of the invention are applicable to address other problems and the scope of the invention should not be limited to addressing the problems specifically discussed throughout this application.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

One or more embodiments of the invention may be implemented using instructions executed by one or more processors of the data management device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A computing device, comprising:
    a persistent storage for storing a deployment manifest repository; and
    a deployment manager programmed to:
        obtain a configuration request for a deployment;
        in response to obtaining the configuration request for the deployment:
            identify, based on the deployment, a plurality of manifests using the deployment manifest repository;
            generate a dependency graph of a plurality of tasks specified in the plurality of manifests;
            order the plurality of tasks using the generated dependency graph;
            generate a deployment script using the ordered plurality of tasks, wherein generating the deployment script using the ordered plurality of tasks comprises:
                generating a constraint check subscript based on all of the tasks of the ordered plurality of tasks;
                generating a plurality of task subscripts corresponding to each task of the ordered plurality of tasks using a script code library; and
                associating the constraint check subscript and the plurality of task subscripts to obtain the deployment script; and
            initiate a configuration of the deployment using the deployment script.

2. The computing device of claim 1, wherein identifying the plurality of manifests based on the deployment and the deployment manifest repository comprises:
    obtaining a first manifest of the manifests based on an infrastructure type of the deployment.

3. The computing device of claim 2, wherein identifying the plurality of manifests based on the deployment further comprises:
    obtaining a second manifest of the manifests based on a usage model type of the deployment.

4. The computing device of claim 3, wherein identifying the plurality of manifests based on the deployment further comprises:
    obtaining the second manifest of the manifests based on a deployment model type of the deployment.

5. The computing device of claim 1, wherein the deployment comprises a distributed system.

6. The computing device of claim 5, wherein the deployment further comprises a coordination point programmed to execute the deployment script.

7. The computing device of claim 1, wherein generating the dependency graph comprises:
    obtaining an identifier of a second task of the plurality of tasks from a first task of the plurality of tasks; and
    in response to obtaining the identifier of the second task, adding a dependency node to the dependency graph corresponding to the first task of the plurality of tasks and orienting the dependency node toward the second task of the plurality of tasks.

8. The computing device of claim 1, wherein the deployment manifest repository comprises:
    the plurality of manifests,
    wherein each manifest of the plurality of manifests is associated with a respective plurality of conditions.

9. The computing device of claim 8, wherein the each respective plurality of conditions specifies at least one condition specified from a group of conditions consisting of an infrastructure type, a usage model type, a deployment model type, a deployment method type, and a connectivity type.

10. The computing device of claim 9, wherein a first manifest of the plurality of manifests is associated with one condition specified from the group.

11. The computing device of claim 10, wherein a second manifest of the plurality of manifests is associated with two conditions specified from the group.

12. The computing device of claim 11, wherein the second manifest of the plurality of manifests is associated with three conditions specified from the group.

13. The computing device of claim 10, wherein the deployment manifest repository further comprises:
    a general manifest not associated with any conditions of the respective plurality of conditions.

14. The computing device of claim 13, wherein the deployment script comprises:
    first instructions corresponding to a first task specified by the plurality of manifests; and
    second instructions corresponding to a second task specified by the general manifest.

15. The computing device of claim 13, wherein the deployment script further comprises:
    third instructions for obtaining parameters used by the first instructions from a user.

16. A method for initiating configuration of a deployment, comprising:
    obtaining a configuration request for the deployment;
    in response to obtaining the configuration request for the deployment:
        identifying a plurality of manifests based on the deployment and a deployment manifest repository;
        generating a dependency graph of a plurality of tasks of the plurality of manifests;
        ordering the plurality of tasks using the generated dependency graph;
        generating a deployment script using the ordered plurality of tasks, wherein generating the deployment script using the ordered plurality of tasks comprises:
            generating a constraint check subscript based on all of the tasks of the ordered plurality of tasks;
            generating a plurality of task subscripts corresponding to each task of the ordered plurality of tasks using a script code library; and
            associating the constraint check subscript and the plurality of task subscripts to obtain the deployment script; and
        initiating the configuration of the deployment using the deployment script.

17. The method of claim 16, wherein identifying the plurality of manifests based on the deployment and the deployment manifest repository comprises:
    obtaining a first manifest of the manifests based on an infrastructure type of the deployment.

18. A non-transitory computer readable medium comprising computer readable program code, which when executed by a computer processor enables the computer processor to perform a method for authorizing a new configuration of user resources of a computing device, the method comprising:
- obtaining a configuration request for a deployment;
- in response to obtaining the configuration request for the deployment:
  - identifying a plurality of manifests based on the deployment and a deployment manifest repository;
  - generating a dependency graph of a plurality of tasks of the plurality of manifests;
  - ordering the plurality of tasks using the generated dependency graph;
  - generating a deployment script using the ordered plurality of tasks, wherein generating the deployment script using the ordered plurality of tasks comprises:
    - generating a constraint check subscript based on all of the tasks of the ordered plurality of tasks;
    - generating a plurality of task subscripts corresponding to each task of the ordered plurality of tasks using a script code library; and
    - associating the constraint check subscript and the plurality of task subscripts to obtain the deployment script; and
  - initiating a configuration of the deployment using the deployment script.

19. The non-transitory computer readable medium of claim 18, wherein identifying the plurality of manifests based on the deployment and the deployment manifest repository comprises:
- obtaining a first manifest of the manifests based on an infrastructure type of the deployment.

* * * * *